United States Patent
Humann et al.

(10) Patent No.: US 12,394,068 B2
(45) Date of Patent: *Aug. 19, 2025

(54) CLOUD FORECASTING FOR ELECTROCHROMIC DEVICES

(71) Applicant: Halio, Inc., Hayward, CA (US)

(72) Inventors: Christian Humann, Berkeley, CA (US); Andrew McNeil, Oakland, CA (US)

(73) Assignee: Smart Window Inc., Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,691

(22) Filed: Jan. 3, 2024

(65) Prior Publication Data

US 2024/0144488 A1  May 2, 2024

Related U.S. Application Data

(63) Continuation of application No. 17/987,783, filed on Nov. 15, 2022, now Pat. No. 11,900,617.
(Continued)

(51) Int. Cl.
*G06K 9/00* (2022.01)
*E06B 9/24* (2006.01)
(Continued)

(52) U.S. Cl.
CPC ............... *G06T 7/248* (2017.01); *E06B 9/24* (2013.01); *G01J 1/42* (2013.01); *G02F 1/163* (2013.01);
(Continued)

(58) Field of Classification Search
CPC ... G06T 7/248; G06T 7/11; G06T 7/13; G06T 7/90; G06T 2207/10024;
(Continued)

(56) References Cited

U.S. PATENT DOCUMENTS 11,900,617 B2 * 2/2024 Humann ................... G06T 7/90
2014/0067733 A1 3/2014 Humann
2017/0293049 A1 10/2017 Frank et al.

FOREIGN PATENT DOCUMENTS

EP 2518254 A1 10/2012
GB 2563126 A 12/2018
(Continued)

OTHER PUBLICATIONS

Wood-Bradley, et al., "Cloud Tracking with Optical Flow for Short-Term Solar Forecasting." Solar Thermal Group, Australian National University, Canberra, Australia, 2012. 6 pages.
(Continued)

*Primary Examiner* — Duy M Dang
(74) *Attorney, Agent, or Firm* — Lowenstein Sandler LLP

(57) ABSTRACT

A method includes identifying images corresponding to sky conditions. The method further includes isolating cloud pixels from sky pixels in each of the images. Responsive to determining percentage of cloud pixels in one or more of the images meets a threshold value, the method further includes determining predicted cloud movement relative to sun position by tracking similar feature points between two or more images of the images. The method further includes causing a tint level of an electrochromic device to be controlled based on the predicted cloud movement relative to the sun position.

20 Claims, 12 Drawing Sheets

Related U.S. Application Data

(60) Provisional application No. 63/280,420, filed on Nov. 17, 2021.

(51) Int. Cl.
    *G01J 1/42*     (2006.01)
    *G02F 1/163*     (2006.01)
    *G06T 7/11*     (2017.01)
    *G06T 7/13*     (2017.01)
    *G06T 7/246*     (2017.01)
    *G06T 7/90*     (2017.01)

(52) U.S. Cl.
CPC .................. *G06T 7/11* (2017.01); *G06T 7/13* (2017.01); *G06T 7/90* (2017.01); *E06B 2009/2464* (2013.01); *G01J 2001/4266* (2013.01); *G06T 2207/10024* (2013.01); *G06T 2207/20021* (2013.01); *G06T 2207/30192* (2013.01)

(58) Field of Classification Search
CPC . G06T 2207/20021; G06T 2207/30192; G01J 1/42; G01J 2001/4266; E06B 9/24; E06B 2009/2464
See application file for complete search history.

(56) References Cited

FOREIGN PATENT DOCUMENTS

| WO | 2016054112 A1 | 4/2016 |
|---|---|---|
| WO | 2020179326 A1 | 9/2020 |

OTHER PUBLICATIONS

Tulpan, et al., "Detection of Clouds in Sky/Cloud and Aerial Images Using Moment Based Texture Segmentation." Conference Paper, Jun. 2017, 11 pages.

Marques, et al., "Intra-hour DNI Forecasting Based on Cloud Tracking Image Analysis." Solar Energy, vol. 91 (2013), pp. 327-336.

Pfister, et al., "Cloud Coverage Based on All-Sky Imaging and Its Impact on Surface Irradiance." National Institute of water and Atmospheric Research, Lauder, Central Otago, New Zealand. Oct. 2003, 14 pages.

Chu, et al., "A Smart Image-Based Cloud Detection System for Intrahour Solar Irradiance Forecasts." Department of Mechanical and Aerospace Engineering, University of California, San Diego. Sep. 2014, 13 pages.

International Search Report and Written Opinion received for PCT Application No. PCT/US2022/050162, mailed Mar. 3, 2023.

\* cited by examiner

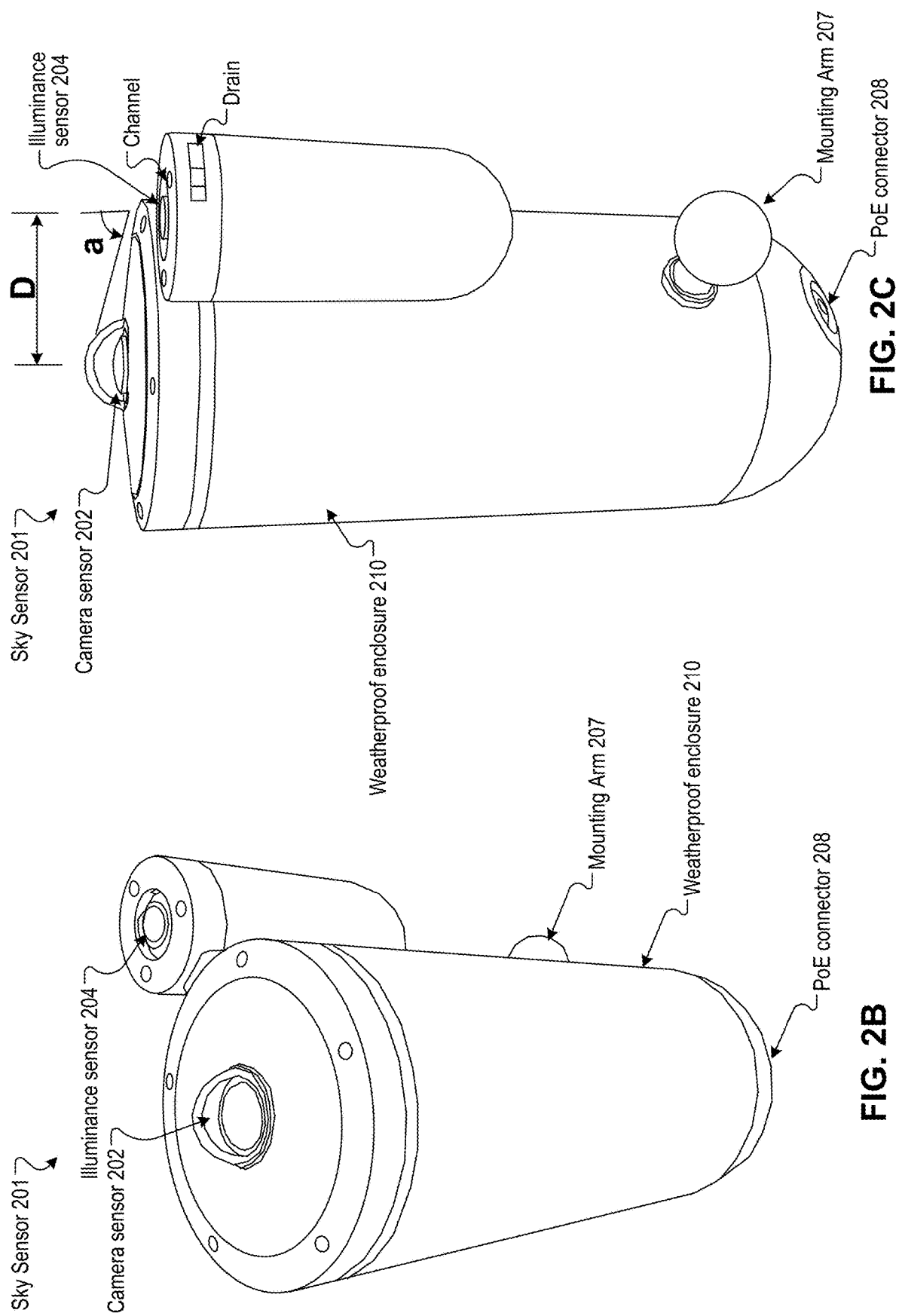

CLOUD FORECASTING FOR ELECTROCHROMIC DEVICES

RELATED APPLICATIONS

This application is a continuation of U.S. patent application Ser. No. 17/987,783, filed on Nov. 15, 2022, which claims the benefit of U.S. Provisional App. No. 63/280,420, filed Nov. 17, 2021, the entire contents of which are incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in building windows to reduce glare and solar heat gains.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIG. 2B-C illustrate a sky sensor, according to certain embodiments.

DETAILED DESCRIPTION

Figure 1:
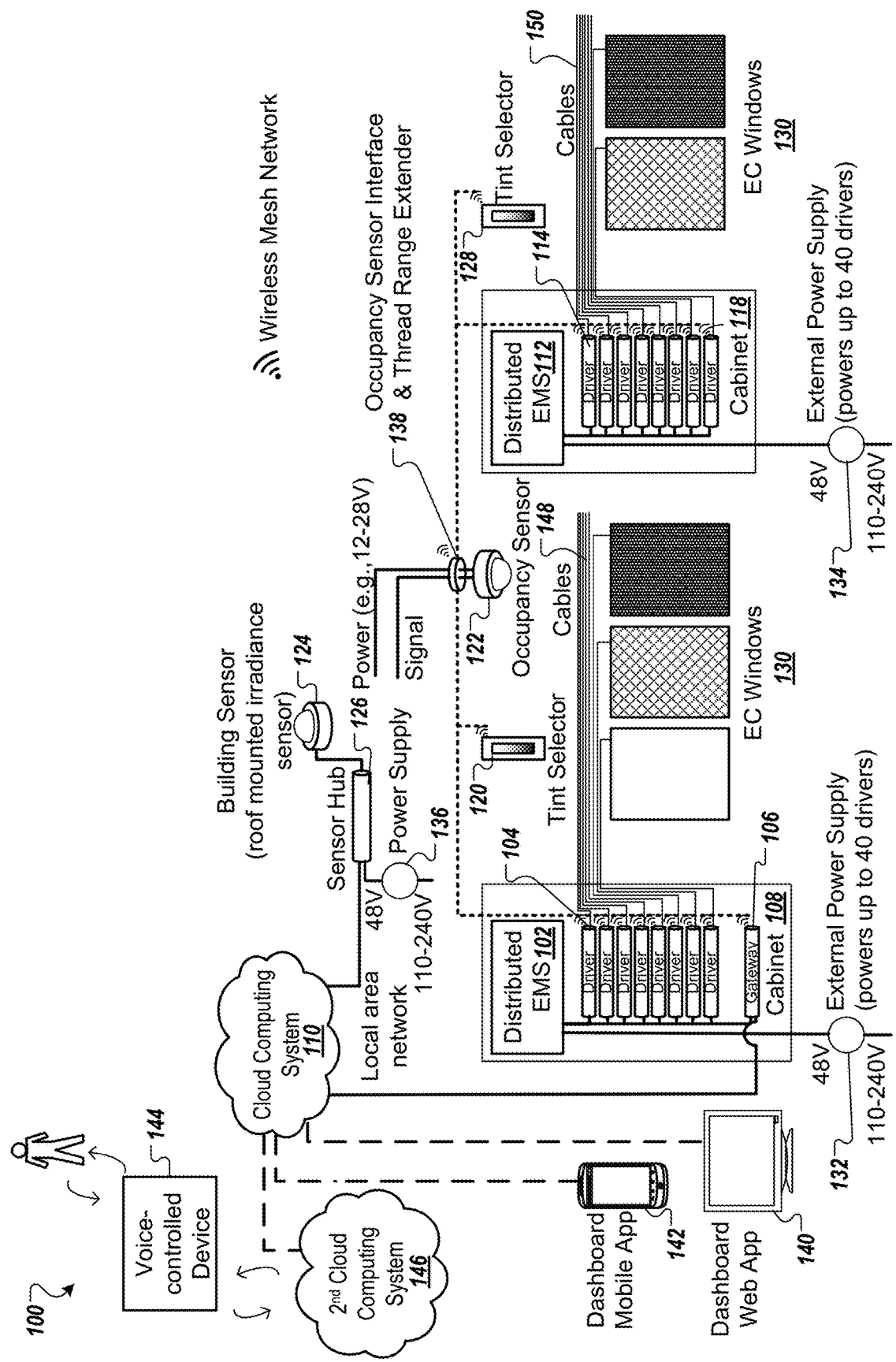
FIG. 1 is a block diagram of an electrochromic window system that provides cloud movement prediction and automated control of an electrochromic device, according to certain embodiments.

Cloud forecasting for electrochromic devices is described. Electrochromic devices can be, for example, used for smart windows (e.g., electrochromic windows) in a commercial or residential building. A smart window refers to one or more glass units whose characteristics (e.g., a tint level representing a particular transmissivity parameter, optical scattering characteristics, etc.) can be changed automatically (e.g., at a particular time, in response to a weather condition, etc.). Selectively tinting smart windows may allow some control of solar heat gain of a building to decrease energy used for heating and/or cooling (e.g., tinting smart windows on sunny summer days allows for less solar heat gain, untinting smart windows in sunny winter days allows for more solar heat gain). Selectively tinting smart windows may provide effective use of daylight (e.g., daylighting) to decrease energy used for lighting. Whereas properly controlled smart windows may reduce energy used for heating, cooling, and lighting, improper control of smart windows may increase energy consumption and decrease user comfort (e.g., not properly allowing natural light, allowing glare from direct sunlight, etc.). A modern multi-story building can include thousands of external and internal windows. As such, controlling electrochromic devices in an efficient manner becomes increasingly important.

Tinting state of smart windows can be controlled via user input (e.g., via a wall mounted control) and/or via a schedule (e.g., clear state in the morning and tinted state in the afternoon) to increase or decrease the amount of sun light coming into an indoor space. This can be used to allow daylighting of an indoor space, reduce glare, reduce heating and/or cooling needs, etc. Outside conditions (e.g., sky, weather, clouds, etc.) dynamically changes. For examples, clouds can block the sun for a period of time and then not block the sun. As another example, outside temperature can change during the day due to rain, snow, clouds, wind, etc. In some examples, a smart window may be controlled to be in a tinted state via user input or a schedule due to unobstructed view of the sun (e.g., glare) or heat gain due to outside conditions. Over the course of the day, clouds may obstruct view of the sun (e.g., there is no longer any glare) or the temperature outside may decrease, but the smart window remains in a tinted state and the building is not able to take advantage of daylighting (e.g., which could decrease energy used for lighting in the space). In some examples, a smart window may be manually controlled to be in a clear state because of a lack of glare (e.g., sun is obstructed by clouds) or a lack of heat gain from outside conditions (e.g., lower outside temperature). Once the sun is not obstructed by clouds or heat gain the outside conditions increases, the smart window remains in a clear state and causes glare, heat gain, etc. Constantly receiving manual user input to control a smart window responsive to changes in outside conditions uses bandwidth, energy consumption, and processing overhead to receive the user input, process the user input, and cause the smart window to change tint state based on the user input. Constantly manually controlling tinting state of smart windows can also be distracting and time consuming.

Conventional smart window systems have an inherent lag-time between tint changes in a smart window that limits a fast response to dynamically changing sky conditions. A smart window can take minutes to change between clear and tinted states. In conventional systems, once glare is coming through a smart window, a user provides user input to change the smart window to a tinted state. Due to the lag-time, the glare comes through the smart window for minutes while the smart window is changing tint states. Once the sun is obstructed by a cloud, a user may provide user input to change the smart window to a clear state. Due to lag-time, the indoor space relies on lighting energy and does not take advantage of daylighting for minutes while the smart window is changing tint states. Due to cloud movement, the direct contribution of the sun (e.g., glare, no glare, heat gain, etc.) may change frequently (e.g., due to small, fast passing clouds). Due to lag-time, the user may be constantly providing user input to change the tint state of the smart window and by the time the smart window is tinted, a cloud may be obstructing the sun or by the time the smart window is cleared, the cloud may have passed. The cycling of smart window tint events leads to wear and tear of the smart window system, user frustration, increased bandwidth used, increased energy usage, and increased processor overhead.

Aspects of the present disclosure address the deficiencies of conventional systems by providing cloud forecasting for electrochromic devices. Processing logic (e.g., of a server device, of a gateway, etc.) identifies images corresponding to sky conditions. The images may be captured (e.g., by a sky sensor) from the same location over a period of time (e.g., every 5 seconds, every 30 seconds). The processing logic isolates the cloud pixels from sky pixels in each of the images. The processing logic may generate a cloud mask that indicates the cloud and/or sky pixels. Responsive to determining a percentage of cloud pixels in one or more of the images meets a threshold value, the processing logic determines a predicted cloud movement relative to sun position. The processing logic causes a tint level of an electrochromic device (e.g., smart window) to be controlled based on the predicted cloud movement relative to the sun position.

In some embodiments, a machine learning model is trained based on data input of historical images (e.g., of sky conditions) and target output of historical pixel data (e.g., cloud masks, cloud pixels, sky pixels, etc.) to generate a trained machine learning model. The pixel data may be generated by manually marking which portions of images are clouds and/or which portions are sky. The pixel data may be labels (e.g., overcast sky, clear sky, etc.) for the images. Current images of sky conditions may be provided to the trained machine learning model and output may be received. Predictive data (e.g., predictive pixel data) may be determined based on the output.

Aspects of the present disclosure result in technological advantages over conventional solutions. The present disclosure results in significant reduction in energy consumption (e.g., battery consumption, heating energy, cooling energy, lighting energy, etc.) by causing tint level of electrochromic devices to be controlled based on predicted cloud movement. For example, the present disclosure can allow more daylighting instead of using lighting energy when clouds are obstructing glare from the sun compared to conventional solutions. The present disclosure controlling electrochromic devices based on predicted cloud movement can avoid manual control and manual overrides and can avoid the increased energy consumption, bandwidth, and processor overhead associated with receiving manual instructions, processing the manual instructions, and causing the tinting state to change based on the manual instructions.

Although some embodiments of the present disclosure are described with respect to images, other embodiments may use other data, such as light detection and ranging (LIDAR) data (e.g., responsive to laser signals (pulses) that travel to an object and then detect arrived signals reflected from the object), radio wave data, coherent Doppler data, incoherent time-of-flight (ToF) data, global positioning system (GPS) data, infrared data, electromagnetic (e.g., optical) data, non-electromagnetic (e.g., acoustic), etc. The present disclosure may use optical data (e.g., images, non-images) from a range of light visible to a human eye (e.g., the 380 to 400 nanometer (nm) wavelength range), the ultra violet (UV) range (e.g., below 380 nm), the infrared range (e.g., above 400 nm), the radio frequency range (e.g., above 1 m), etc.

Although some embodiments of the present disclosure are described with respect to predicting cloud movement (e.g., that at least partially obstruct the sun), other embodiments may include predicting other dynamic objects (e.g., that at least partially obstruct glare from the sun or reflections).

FIG. 1 is a block diagram of an electrochromic window system 100 (e.g., smart window system) that provides cloud movement prediction and automated control of an electrochromic device, according to some embodiments. The electrochromic window system 100 includes a first cabinet 108 in which a first distributed energy management system (EMS) 102, a first set of drivers 104, and a gateway 106 are located. In an alternate embodiment the drivers 104 may be integrated drivers where one or more drivers are integrated into the EC windows. Each of the set of drivers 104 is coupled to an individual one of a set of electrochromic (EC) windows 130 (e.g., electrochromic devices). Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the cabinet 108. For example, 16 AWG 2 conductor plenum cables can provide lower voltage (48V) or higher voltage (110-240V) to the cabinet 108. The external power supply 132 can be located in proximity to the cabinet 108 or farther away from the cabinet 108, such as up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can be used to power the components in the cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

In some embodiments, a driver for an EC window may be integrated into the EC window itself in either the frame of the window, in the integrated glass unit (IGU) of the EC window, or in the laminated glass unit (LGU) of the EC window.

Each EC window may include an electrochromic panel (e.g., glass or film) that can change transmissivity with the application of electric current and voltage. The change of transmissivity typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver and the first driver may control the tint level of the EC window. In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window. The different transmissivities of the EC windows may be referred to as tint levels (e.g., 0% tint level is 65% transmissivity, 50% tint level is 21% transmissivity, 100% tint level is 2% transmissivity, etc.).

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130, as well as the power state of other power sources (e.g., multi-device boost power supply). For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments the idle power level of an EC window may be zero, for example when the type of EC device used only requires power to switch from one optical transmission state to another optical transmission state. The power state information (e.g., idle state, tinted state, transitioning between states, etc.) may be provided to the gateway 106 and may be shared with the cloud computing system 110.

The additional power provided by the one or more power sources can enable fast and uniform switching in a variety of conditions, and in particular when the EC window 130 includes a gradient conductive layer.

An EC window 130 including a gradient transparent conductive layer can have very fast switching speed (e.g., about 10 seconds to 2 minutes, about 30 seconds to 2 minutes, less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an EC window 130 incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of electrochromic devices. Additionally, the distributed EMS can be used to drive multi-panel electrochromic windows that include more than one EC window 130 connected in series or parallel. A multi-panel electrochromic window may be one where the EC windows 130 are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one EC window 130 is laminated to a carrier glass substrate to form larger sized windows. In another embodiment a single driver may be used to drive multiple electrochromic windows that may be in a group of electrochromic windows. For example a single driver may drive two or more electrochromic windows.

The gateway 106 is operatively coupled to a cloud computing system 110. A cloud computing system refers to a collection of physical machines (e.g., server devices), that host applications providing one or more services to multiple components (e.g., gateway 106, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, automated control, cloud forecasting, etc.) to users accessing the cloud computing system 110 via a network. The applications may allow users to manipulate (e.g., access, create, edit, store, delete, share, collaborate, print, etc.) electronic documents (e.g., schedules, rules, configurations, automated control, cloud forecasting, etc.). The cloud computing system 110 may include one or more server devices and one or more data stores. The cloud computing system 110 may include a control module 220 (e.g., cloud forecasting module 222, automated control module 224, see FIG. 2A). The control module 220 may include one or more applications, one or more server devices, etc. The gateway 106 can be hardwired (e.g., via Ethernet) to a network device of a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using communications, such as using IPV4, IPv6, or Transport Layer Security (TLS) networking protocols. The cloud computing system 110 can provide control logic, cloud forecasting, tint prediction, automated control (e.g., cause tint level of the EC windows 130 to be controlled to avoid glare), and configuration for the electrochromic window system 100. The cloud computing system 110 may receive information (e.g., via one or more application programming interfaces (APIs), weather information, etc.) for providing automated control, etc. The cloud computing system 110 may determine which EC windows 130 each device (e.g., tint selector 120 or 128, gateway 106, etc.) and each application (e.g., dashboard mobile app 142, dashboard web app 140, etc.) is authorized to view and/or control and the priority of control. For example, the cloud computing system 110 may determine that the tint selector 120 is authorized to control EC windows 130 that are connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control which EC windows 130. In some embodiments, the cloud computing system 110 may authorize access by components (e.g., tint selectors 120 and 128, gateway 106, etc.) to a wireless mesh network (e.g., during commissioning or set-up) and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module 226 (e.g., see FIG. 2A) to receive data from the gateway 106, sensor hub 126, etc. (e.g., for providing cloud forecasting and automated control, for providing glare control, for providing data visibility) and to transmit data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106 and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.)

The cloud computing system 110 can provide automation algorithms, data analytics, user management, security protocols, and the like. The cloud computing system 110 can provide extensive system health monitoring and proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smart phone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and may transmit the user input to the cloud computing system 110. Responsive to determining that the user input is a request to view information (e.g., monitor current status of components, current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture that is exposed through APIs to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The centralized data aggregation of the cloud computing system 110 may also include data from the manufacturing, testing, and assembly of the EC Windows 130 and any associated hardware of the electrochromic window system 100 (e.g. drivers 104, gateways 106, etc.). The cloud computing system 110 can leverage various authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

It should be noted that, after the drivers and the distributed EMS are configured via the gateway, the distributed EMS and driver behavior is not dependent on the gateway for safe operation. That is, the gateway can be disconnected and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), and a sensor hub 126.

The sensor hub 126 can be powered by an external power supply 136 and can be hardwired to a local area network, much like the gateway 106.

The occupancy sensor interface, thread range extender 138, and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network.

The tint selector 120 can be a device that is mounted on a wall where a user can activate a transition of one or more EC windows 130. The tint selector 120 can be mounted or otherwise disposed in a building having the EC windows 130 to permit user control of one or more EC windows 130 (e.g., the set of EC windows). The tint selector 120 can be programmed to be part of group of EC windows (e.g., a set of windows that are to be set at the same tint level, e.g., all EC windows in the group tinted 50%). That is, the tint selector 120 can be associated with the set of drivers 104 and the gateway 106. Alternatively, the tint selector 120 can be associated with a scene of one or more EC windows. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change tint level. The tint selector may also transmit the user input to the gateway 106 to cause the gateway to transmit the user input to the cloud computing system 110.

The electrochromic window system 100 can include one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

Figure 2A:
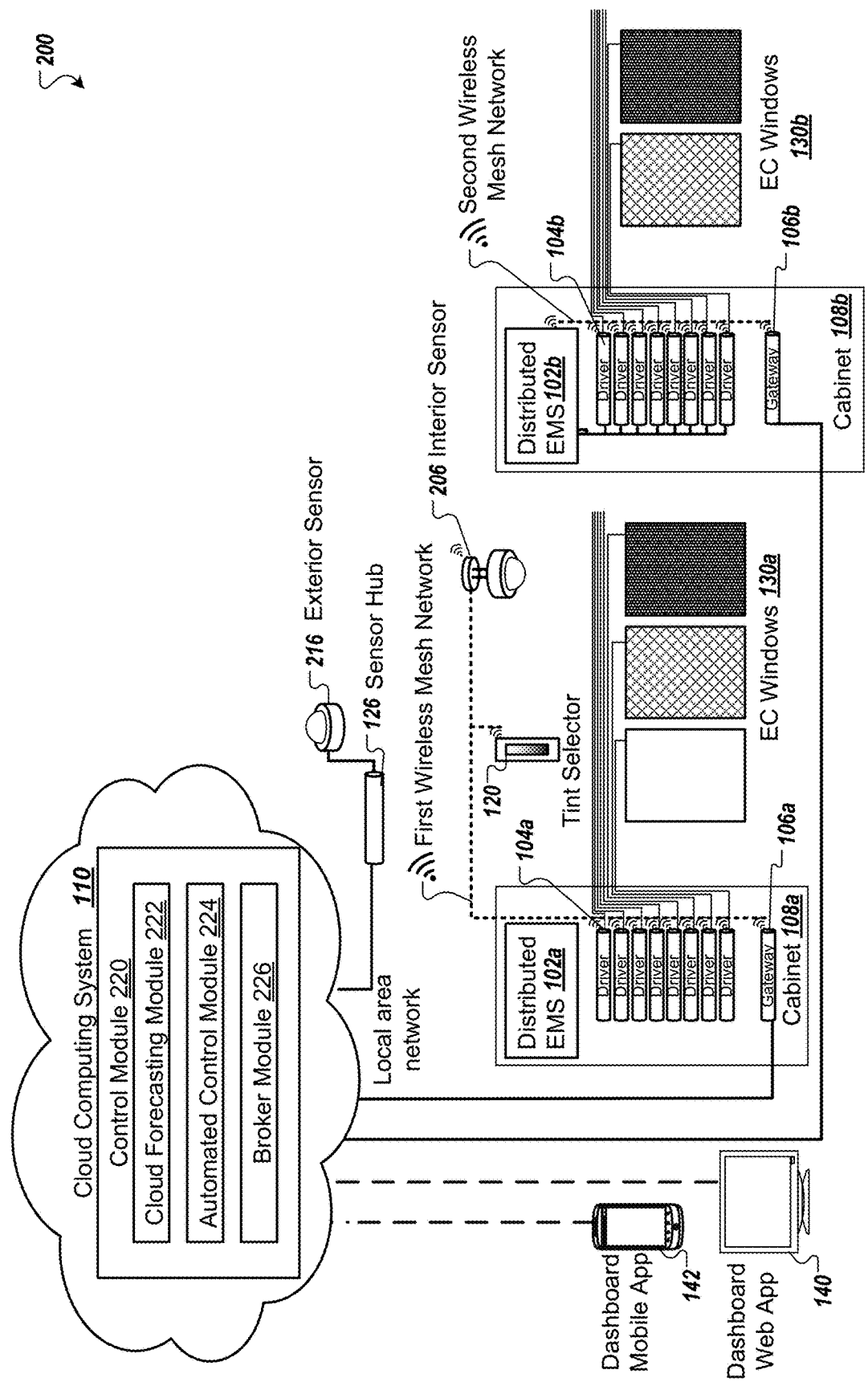
FIG. 2A is a block diagram of an electrochromic window system including a control module, according to certain embodiments.

FIG. 2A is a block diagram of an electrochromic window system 200 (e.g., smart window system) including a control module 220, according to certain embodiments. The control module 220 may include one or more of a cloud forecasting module 222, an automated control module 224, or a broker module 226. Components with the same reference number as those in FIG. 1 may include similar or the same functionalities as those described in relation to FIG. 1. One or more modules, functionalities, data stores, etc. of cloud computing system 110 may be provided by a third party service. In some embodiments, the broker module 226 may be provided by a third party (e.g., a third party on-demand cloud computing platform provider). In some embodiments, the broker module 226 is provided by the same entity that provides the cloud forecasting module 222 and/or the automated control module 224. In some embodiments, the automated control module 224 is a single module that operates on the cloud computing system 110. In some embodiments, the automated control module 224 includes two or more modules (e.g., two or more microservices, two or more applications). In some embodiments, the automated control module 224 may include one or more applications and one or more servers. In some embodiments, the cloud forecasting module 222 is a single module that operates on the cloud computing system 110. In some embodiments, the cloud forecasting module 222 includes two or more modules (e.g., two or more microservices, two or more applications). In some embodiments, the cloud forecasting module 222 may include one or more applications and one or more servers.

The electrochromic window system 200 may include the cloud computing system 110 and components including one or more of drivers 104, one or more gateways 106, EC windows 130, distributed EMS 102, tint selector 120, interior sensors 206, sensor hub 126, exterior sensors 216, etc. The cloud computing system 110 may include the cloud forecasting module 222, the automated control module 224 and the broker module 226. The automated control module 224 may identify, send instructions to, and receive data from the components of the electrochromic window system 200. The cloud forecasting module 222 may identify historical images and associated sensor data (e.g., data received from interior sensors 206 and/or exterior sensors 216 at the time of capturing of the images).

The cloud computing system 110 is coupled to one or more gateways 106, a sensor hub 126, a dashboard web app 140, and a dashboard mobile app 142. Each gateway 106 may be coupled via a corresponding wireless mesh network to drivers 104, interior sensors 206 (e.g., occupancy sensor 122, occupancy sensor interface and thread range extender 138, etc.), one or more tint selectors 120, and the distributed EMS 102. The gateway 106 may include characteristics of one or more of a hub, proxy, or aggregator. A sensor hub 126 may be coupled to one or more exterior sensors 216. The drivers 104, distributed EMS 102, tint selector 120, and interior sensors 206 may be disposed proximate the gateway 106 (e.g., within the building, within range of the wireless mesh network, etc.). The interior sensors 206 may include one or more of interior light sensors, a sensor on a window to collect EC window 130 transmittance data, sensors to collect photographic data from interior of building, occupancy sensors, etc. The exterior sensors 216 may be disposed proximate sensor hub 126 (e.g., proximate the roof of the building, on the roof, proximate the edge of the roof, etc.). The exterior sensors 216 may include one or more of light sensors on the sides of buildings, temperature and/or humidity sensors, sensors (or cameras) to collect photographic data of cloud cover (or irradiance), irradiance sensor, rooftop pyranometer sensor (e.g., measure total global irradiance, measure diffuse horizontal irradiance (DHI), calculate direct normal irradiance, include non-visible spectrum), an illuminance sensor, an imaging device, etc. DHI may refer to the terrestrial irradiance received by a surface (e.g., horizontal surface) which has been scattered or diffused by the atmosphere. DHI may be a component of global horizontal irradiance which may not come from the beam of the sun (e.g., beam may be about a 5-degree field of view concentric around the sun).

Each gateway 106 may be coupled, via a corresponding wireless mesh network, to corresponding drivers 104 that control corresponding EC windows 130. For example, gateway 106a may be coupled, via a first wireless mesh network, to drivers 104a that control EC windows 130a and gateway 106b may be coupled, via a second wireless mesh network, to drivers 104b that control EC windows 130b (e.g., the EC windows 130 span more than one wireless mesh network). The drivers 104a may be coupled to a gateway 106a and drivers 104b to gateway 106b because of capacities (e.g., capacity of each gateway 106, cabinet 108, distributed EMS 102, wireless mesh network, etc.), length of cables, etc.

In some embodiments, the automated control module 224 may generate an obstruction map based on one or more of an image, dimensions, or a 3D model. The automated control module 224 may receive a sun map indicating the position of the sun at different times of each day. The automated control module 224 may receive propagation information indicating what portions of each room corresponding to an electrochromic device may receive direct sunlight. The automated control module 224 may store one or more of a corresponding obstruction map, sun map, reflection map, illuminance value (e.g., vertical illuminance calculation, bright sky calculation, bright sky glare), or propagation information (e.g., allowable sunlight map) for each electrochromic device. The automated control module 224 may receive (e.g., via broker module 226) sensor data and/or images via the sensor hub 126 from one or more exterior sensors 216. The automated control module 224 may use the same sensor data for multiple electrochromic devices in the same area (e.g., same building, neighboring buildings, etc.). The automated control module 224 may receive predicted cloud movement (e.g., predicted data, predicted pixel data, predicted cloud mask) from the cloud forecasting module 222.

In some embodiments, the automated control module 224 may generate and/or retrieve one or more of an obstruction map, allowable sunlight map, reflection map, illuminance value (e.g., vertical illuminance calculation, bright sky calculation, bright sky glare), or the like. For each electrochromic device, the automated control module 224 may determine, based on a corresponding obstruction map, a corresponding sun map, corresponding propagation information (e.g., allowable sunlight map), corresponding reflection map, corresponding illuminance value, predicted cloud movement, and/or sensor data, a tint level (e.g., tinted or untinted, etc.) of a corresponding electrochromic device. For example, responsive to determining direct sunlight will not enter any portion of a room where sunlight is not allowed (e.g., on occupants, desks, monitors, etc.), the automated control module 224 may determine the corresponding electrochromic device is to be untinted. Responsive to determining direct sunlight will enter a portion of a room where sunlight is not allowed, the automated control module 224 may determine the corresponding electrochromic device is to be tinted.

The automated control module 224 may transmit tint instructions (e.g., via broker module 226) to a corresponding gateway 106 and the gateway 106 is to instruct the corresponding driver 104 to change the tint level of a corresponding EC window 130 based on the instructions.

The sensor hub 126 may be coupled to one or more exterior sensors 216 (e.g., a roof mounted irradiance sensor, a camera, an imaging device, an illuminance sensor, sky sensor 201 of FIGS. 2B-C, etc.). The sensor hub 126 may receive sensor data and/or images from each of the exterior sensors 216. The processing device 212 of the sensor hub 126 may process the sensor data and/or images received from the exterior sensors 216 and/or transmit the sensor data and/or images to the cloud computing system 110. The processing device 212 may process and/or transmit the sensor data and/or images based on configurations (e.g., configuration file) of the sensor hub 126. In some embodiments, the processing device 212 only transmits sensor data and/or images at specified times (e.g., during daylight hours) and not at other times (e.g., not at night). In some embodiments, the processing device 212 determines a first subset of the sensor data and/or images (e.g., sensor data and/or images that has changed more than a threshold amount, sensor data and/or images that indicates change in direct sunlight, etc.) that is more relevant than a second subset of the sensor data and/or images (e.g., sensor data and/or images that does not change over time, sensor data and/or images that indicates no change in direct sunlight) and transmits the first subset to the cloud computing system 110 at a faster rate than the second subset (e.g., only transmits the first subset, stores the second subset to send periodically, disregards the second subset, etc.). In some embodiments, the processing device 212 of the sensor hub 126 determines a median sensor data value and/or images (e.g., for ten second intervals) and periodically transmits the median sensor data values and/or images (e.g., on thirty second intervals) to the cloud computing system 110. In some embodiments, sensor data and/or images that is not transmitted may be disregarded (e.g., not stored).

In some embodiments, the cloud forecasting module 222 may receive data from (e.g., produced by) the automated control module 224 (e.g., an obstruction map, a reflection map, a spectral map, sun map, illuminance value, allowable sunlight map, etc.), data from the interior sensors 206 and exterior sensors (e.g., room temperatures, sunlight exposure, etc.). Responsive to the cloud forecasting module 222 determining, based on the received data, that the electrochromic device is to be in a tinted state if the sun position is not obstructed by clouds (e.g., to prevent glare, to prevent heat gain), the cloud forecasting module 222 may then determine the predicted cloud movement. Responsive to the cloud forecasting module 222 determining, based on the received data, that the electrochromic device is to be in a cleared state (e.g., no glare when in a cleared state), the cloud forecasting module 222 may not determine the predicted cloud movement.

FIGS. 2B-C illustrate a sky sensor 201 (e.g., sky camera), according to certain embodiments. The sky sensor 201 can be used in an electrochromic window system 100 of FIG. 1 or electrochromic window system 200 of FIG. 2A. In some embodiments, building sensor 124 and/or exterior sensor 216 includes sky sensor 201.

Sky sensor 201 may include an imaging device configured to capture images and/or one or more sensors. In some embodiments, sky sensor 201 includes a camera sensor 202 and an illuminance sensor 204. The camera sensor 202 may be a 360-degree HDR camera sensor. Sky sensor 201 may also include a mounting arm 207, a Power over Ethernet (PoE) connector 208, and a weatherproof enclosure. The sky sensor 201 may include a transparent dome (e.g., a glass dome) on a top surface of a first enclosure. The camera sensor 202 may be located under the transparent dome. The illuminance sensor 204 may be on a top surface of a second enclosure that is adjacent to the first enclosure.

The first enclosure includes a first diameter (e.g., about 3.505 inches) and the second enclosure has a second diameter (e.g., about 1.516 inches (radius is about 0.758). The transparent dome can include a specified diameter (e.g., about 1.008 inches, about 25 mm or about 0.984 inches) and can be located in a center of the first enclosure. The camera sensor 202 is located under the transparent dome and the transparent dome serves to protect the camera sensor 202. The top surface of the first enclosure can be slightly sloped to allow moisture to drain off the surface of the first enclosure. Adjacent to the first enclosure is a second enclosure that houses the illuminance sensor 204.

In some embodiments, the illuminance sensor 204 can be located at a specified distance, D, from the camera sensor 202. The specified distance is to be small enough to capture light data from the same approximate location, but large enough to not be interfering with each other. In at least one embodiment, the illuminance sensor 204 is located about a specified angle (labeled "a" in FIG. 2C), such as 5 degrees, below the top of the transparent dome of the camera sensor 202. The top surface of the primary and secondary cylindrical enclosures can be on the same plane, but the illuminance sensor 204 can be located slightly below the camera sensor 202 so that the transparent dome does not obstruct the illuminance sensor 204 and the illuminance sensor 204 does not obstruct the camera sensor 202. In another embodiment, the illuminance sensor 204 and the camera sensor 202 are located on the same plane. In at least one embodiment, the primary and secondary cylindrical enclosures are separate enclosures. The top cap of the primary and/or secondary cylindrical enclosures can be metal, such as aluminum so that it can be heated by the heater. The enclosures can be metal or plastic but are to be sturdy and withstand weather conditions on a roof of a building, such as wind. In at least one embodiment, the sky sensor 201 can have an industrial design that is patterned based on a telescope (e.g., substantially cylindrical), but any industrial design can be used for functional or aesthetic purposes. In another embodiment, the camera sensor 202 and the illuminance sensor 204 can be in an integrated housing, while maintaining the appropriate positioning between the two sensors. In at least one embodiment, the top surfaces can be slightly curved so that snow and water can drain off the top surface, especially when the snow is heated by the heater.

In at least one embodiment, as illustrated in FIG. 2C, the illuminance sensor 204 can be positioned within a channel (e.g., a recessed channel is disposed around the illuminance sensor 204). The channel can operate to obstruct the illuminance from the light below the sensor and provide a route for water to flow out a drain on the side of the secondary cylindrical enclosure. The channel can create the hemisphere of the illuminance sensor 204 to be at 180 degrees, instead of 190 degrees, for example.

In at least one embodiment, as illustrated in FIG. 2C, the sky sensor 201 has a mounting arm 207 (e.g., an attachment mechanism, such as a mounting ball). The mounting ball can mount to a standard rooftop mast system with ease of leveling using an articulating arm mount, such as an off-the-shelf articulating arm. The articulating arm can be used for both leveling and direction of the sky sensor 201 for alignment with respect to true north or true south. Alternatively, other mounting mechanisms can be used to secure the sky camera to a mast system or other structures on a roof of a structure. In at least one embodiment, a package in which the sky sensor 201 is stored can contain a leveling mechanism, such as in a foam piece to protect during shipping, to level the sky sensor 201 during installation.

Figure 3:
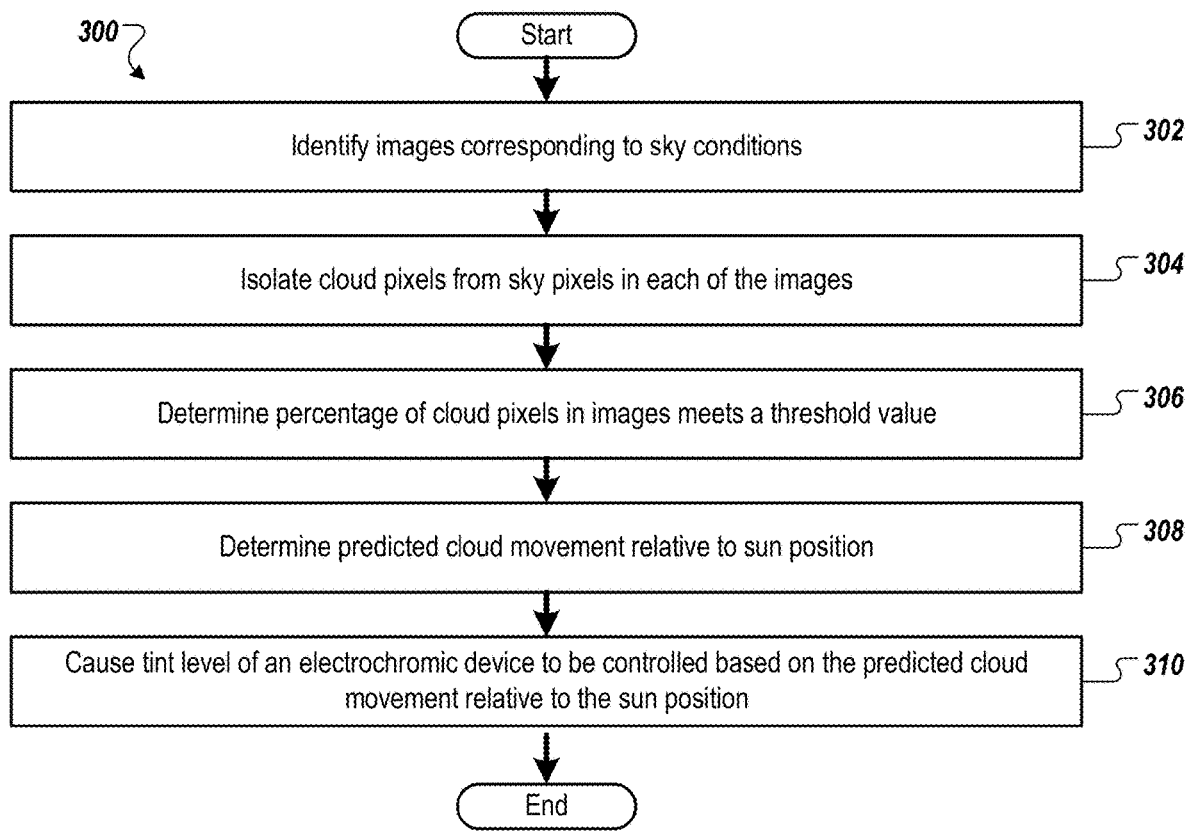
FIG. 3 is a flow diagram of a method of controlling an electrochromic device, according to certain embodiments.

FIG. 3 is a flow diagram of a method of controlling an electrochromic device (e.g., EC window 130), according to certain embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cloud computing system 110 of one or more of FIGS. 1-2A. In some embodiments, the method 300 is performed by one or more server devices of the cloud computing system 110. In some embodiments, the method 300 is performed by a processing device of the cloud computing system 110 (e.g., a non-transitory machine-readable storage medium storing instructions which, when executed cause a processing device to perform method 300). In some embodiments, the method 300 is performed by control module 220 of the cloud computing system 110. In some embodiments, one or more portions of method 300 is performed by one or more other components (e.g., gateway, etc.). For example, the server device may transmit instructions to the gateway and the gateway may use the instructions provide cloud forecasting and automated control of an EC window 130.

For simplicity of explanation, method 300 is depicted and described as a series of operations. However, operations in accordance with this disclosure can occur in various orders and/or concurrently and with other operations not presented and described herein. Furthermore, not all illustrated operations may be performed to implement method 300 in accordance with the disclosed subject matter. In addition, those skilled in the art will understand and appreciate that methods 300 could alternatively be represented as a series of interrelated states via a state diagram or events.

In some embodiments, method 300 is performed responsive to determining that at the current sun position (e.g., based on sun map), the electrochromic device is to be at a tinted level unless the sun is being at least partially blocked by one or more clouds (e.g., schedule indicates electrochromic device is to be at a tinted level to prevent glare). For example, the sun may be in a position that would cause glare (e.g., direct view of the sun, reflection of the sun) in a portion of an indoor space where there are work stations unless the sun is at least partially blocked by one or more clouds. In some embodiments, an obstruction map, reflection map, illuminance value (e.g., vertical illuminance calculation, bright sky calculation, bright sky glare), and/or propagation information (e.g., allowable sunlight map) are used to determine whether the electrochromic device is to be tinted unless the view from the electrochromic device is blocked by one or more clouds.

In some embodiments, method 300 is performed responsive to determining that an illuminance value (e.g., vertical illuminance calculation, bright sky calculation, and/or bright sky glare based on illuminance value measured by sky sensor 201) meets a threshold value. Responsive to an illuminance value being less than the threshold value, images may not be captured of the sky conditions and the electrochromic device may be set to a clear state (e.g., if the sky is not bright enough, the electrochromic device may be at a lower tinting level).

At block 302, the processing logic identifies images (e.g., FIG. 4A) corresponding to sky conditions. The images may be captured by an imaging device (e.g., sky sensor 201) mounted to a building that includes an electrochromic device of block 310 or may be located proximate the building (e.g., mounted to a neighboring building). The imaging device may be mounted on the roof. The imaging device may be mounted on the electrochromic device of block 310. The imaging device may be located in the indoor space proximate the electrochromic device of block 310. The images may be captured from above the electrochromic device (e.g., from a satellite, etc.). The images may be include sky conditions (e.g., sky, clouds, sun, etc.) viewable via the electrochromic device of block 310.

Figure 5C:
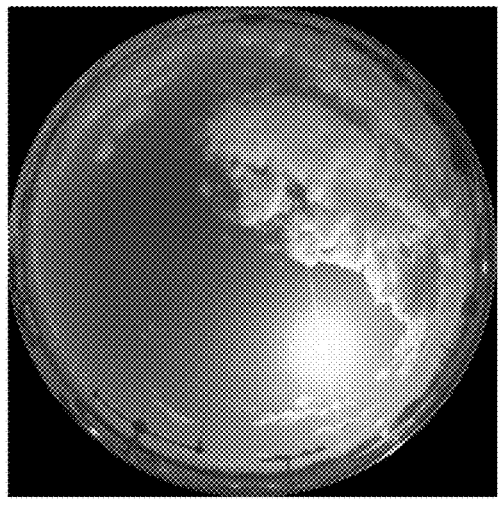
FIGS. 5A-F are images used with controlling an electrochromic device, according to certain embodiments.
Figure 5F:
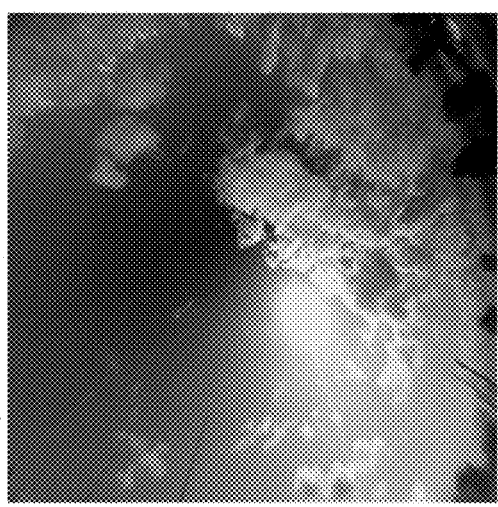
Figure 5B:
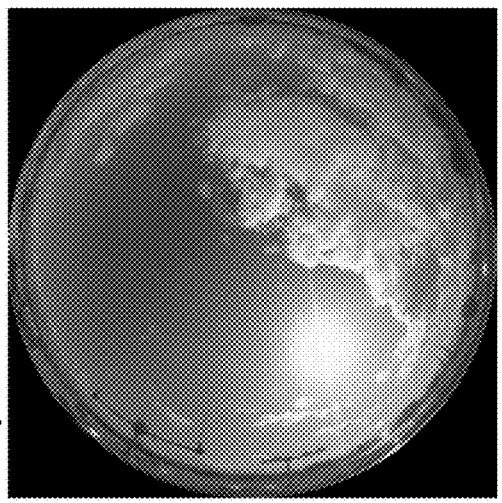
Figure 5E:
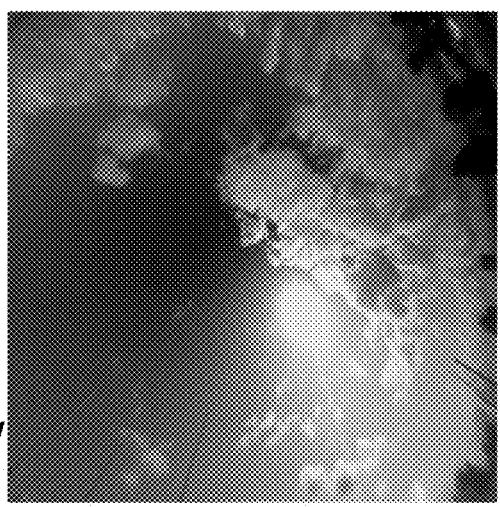
Figure 5A:
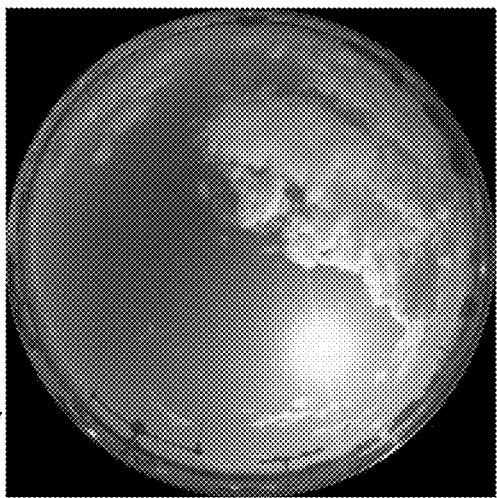
Figure 5D:
Figure 6A:
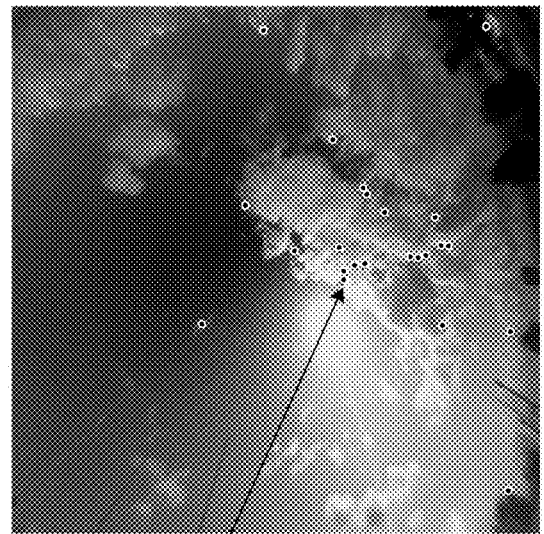
FIGS. 6A-D are images used with controlling an electrochromic device, according to certain embodiments.
Figure 6B:
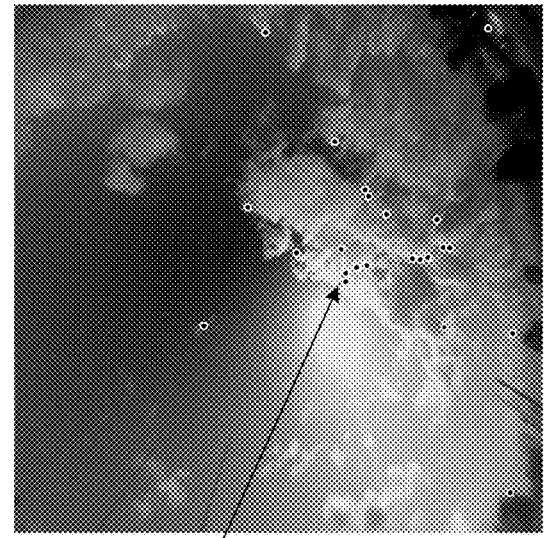
Figure 6C:
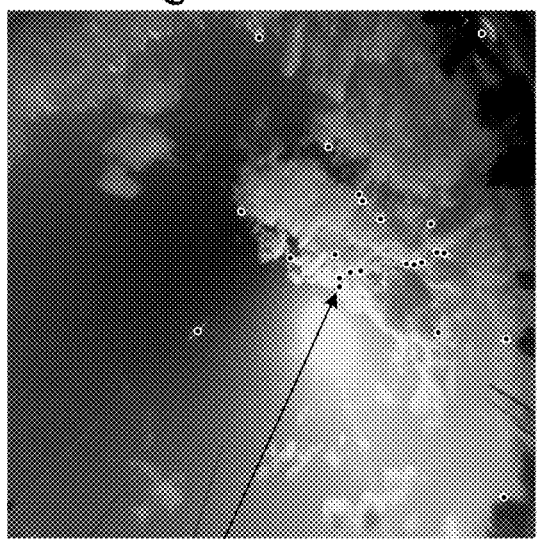
Figure 6D:
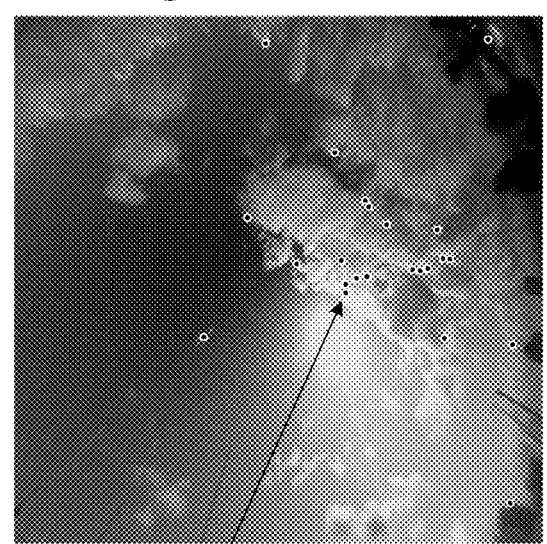

In some embodiments, the images are a series of auto-exposure, fisheye, low dynamic range (LDR) images that were captured at a set frequency (e.g., captured every 5 seconds, captured every 30 seconds, etc.) and were undistorted by projecting the pixels onto a rectangular plane (e.g., undistorting images 500A-C of FIGS. 5A-C to generate undistorted images 500D-F of FIGS. 5D-5F).

In some embodiments, one or more of the images are captured by a sky sensor 201 of FIGS. 2B-C. The images may be of a full sky dome (e.g., 360 degree angle camera).

The images may be captured by multiple imaging devices. In some embodiments, a first subset of the images is captured by a first imaging device and a second subset of the images is captured by a second imaging device. The processing logic may triangulate, based on the images from different imaging devices, to determine a height of the one or more clouds (e.g., to control the electrochromic device).

Figure 4B:
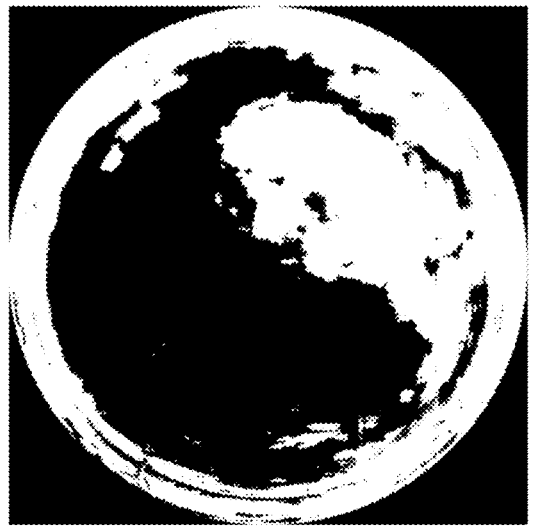
FIGS. 4A-C are images used with controlling an electrochromic device, according to certain embodiments.

At block 304, the processing logic isolates cloud pixels from sky pixels in each of the images (e.g., see FIG. 4B). The cloud pixels may be a pixel in the image that is associated with a cloud and a sky pixel is a pixel in the image that is an unobstructed view of the sky (e.g., not covered by a cloud, not obstructed by a building, etc.). In some embodiments, a cloud pixel has a threshold amount of red and a sky pixel has a threshold amount of blue. In some embodiments, the isolating of the cloud pixels from the sky pixels includes using a normalized red and blue channel ratio to determine whether a pixel corresponds to cloud or sky.

In some embodiments, the processing logic generates a cloud mask (e.g., FIG. 4B) based on the cloud pixels and/or sky pixels. The cloud mask may identify each cloud pixel and each sky pixel. For example, each cloud pixel may be white and each sky pixel may be black. In some embodiments, the processing logic determines cloud-edge (e.g., perimeter, lines that are contours around edges of clouds) to cloud-area (e.g., how many pixels fill in the contours) ratio from the cloud mask (e.g., see FIG. 4C).

In some embodiments, the isolating of the cloud pixels from the sky pixels is via trained machine learning model (e.g., see FIGS. 8-11C). The images may be provided to a trained machine learning model and output may be received from the trained machine learning model. Based on the output, a cloud mask may be determined.

In some embodiments, the processing logic identifies cloud pixels in an image (e.g., pixels that meet a threshold amount of red) and determines that any pixel that is not a cloud pixel is a sky pixel. In some embodiments, the processing logic identifies sky pixels in an image (e.g., pixels that meet a threshold amount of blue) and determines that any pixel that is not a sky pixel is a cloud pixel. In some embodiments, any non-cloud pixel (e.g., buildings, ground, unobstructed sky, horizon, etc.) is identified as a sky pixel. In some embodiments, the cloud pixels and obstruction map are used to determine sky pixels.

At block 306, the processing logic determines percentage of cloud pixels in images meets a threshold value. In some embodiments, the determining that the percentage of cloud pixels meets the threshold value includes determining the cloud-edge to cloud-area ratio meets the threshold value.

Figure 7:
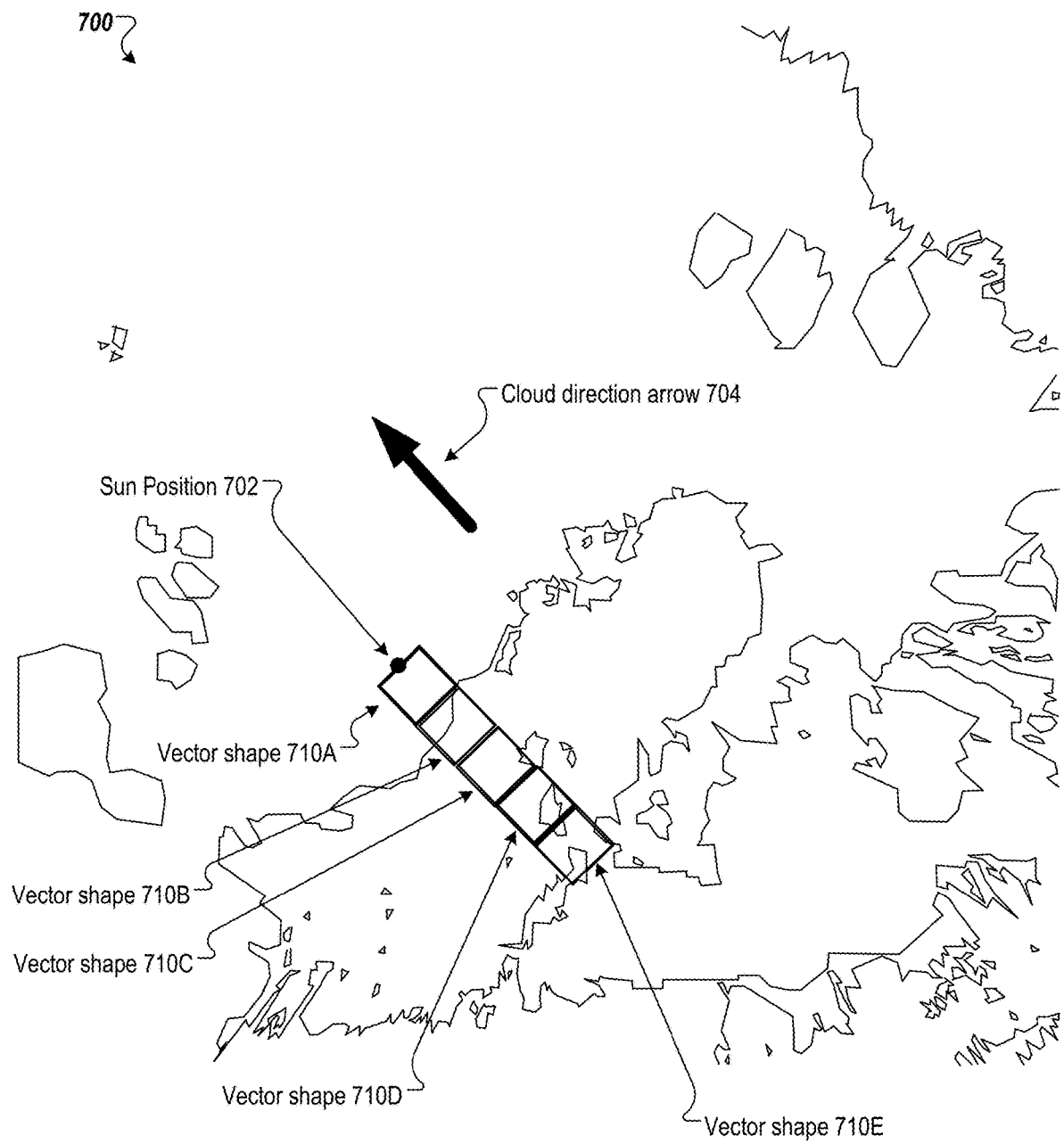
FIG. 7 illustrates pixel data, according to certain embodiments.

In some embodiments, the processing logic generates, based on the cloud pixels and/or sky pixels, vector shapes (e.g., see FIG. 7). A vector shape may be a rectangular, triangular, conical, etc. A first vector shape is located proximate the sun position and a second vector shape is located proximate the first vector shape in a direction of about 180 degrees from the cloud direction angle (e.g., the first vector shape is between the sun position and the second vector shape). Each vector shape may represent a respective predicted time event that is to occur after the capturing of the images, where the length and distance from the sun position of each vector shape correlates to a cloud speed. The processing logic may calculate the percentage of cloud pixels in each vector shape corresponding to the respective predicted time event. Responsive to the percentage of cloud pixels in each of a threshold amount of vector shapes in a row meeting a threshold percentage, the processing logic causes the tint level of the electrochromic device to be changed. For example, if each vector shape represents one minute and if at least 5 vector shapes (e.g., at least five minutes) meet 80% cloud pixels, the processing logic may cause the electrochromic device to be untinted.

The processing logic may use image-based characterization of current sky conditions using a cloud detection algorithm for isolating cloud pixels from sky pixels and calculating the percentage of cloud pixels. If the percentage of clouds is greater than a predetermined amount, then the processing logic may continue with a cloud forecasting algorithm (e.g., continue to block 308). In some embodiments, the processing logic uses an optimized convolutional neural network (CNN) or region-based CNN for cloud detection to create a binary segmentation mask (e.g., cloud mask) where cloud pixels are white and sky pixels are black. Fixed and adaptive threshold methods may also be used for creating a binary segmentation mask where cloud pixels are white and sky pixels are black (e.g., using a normalized red and blue channel ratio for determining whether a pixel is cloud or sky). For example:

Fixed/Adaptive Threshold value=$h$

NBRR=$(b-r)/(b+r)$ $h*$(NBRR)<NBRR=cloud $h*$(NBRR)>NBRR=sky

NBRR is the normalized blue and red ratio, b is intensity of the blue channel in the red green blue (RGB) color space, and r is intensity of the red channel in the RGB color space.

In some embodiments, characteristics of the clouds may be determined by calculating the cloud-edge to cloud-area ratio from the cloud mask. If the ratio is less than a predetermined amount, then the processing logic continues with the forecasting algorithm (e.g., continue to block 308).

The precalculated values for 1200×1200 images may be:

Value>=0.06->small scattered clouds (e.g., cumulus clouds;

0.06>Value>0.007->large, monolithic clouds; and

Value<=0.007->fully overcast sky (e.g., stratus clouds).

At block 308, the processing logic determines predicted cloud movement relative to sun position. The determining of the predicted cloud movement may be based on the vector shapes. The determining of the predicted cloud movement may be based on tracking similar feature points between two or more images (e.g., features points 610 of FIGS. 6A-D).

At block 310, the processing logic causes a tint level of an electrochromic device to be controlled based on the predicted cloud movement relative to the sun position. Block 310 may be further based on height of the one or more clouds (e.g., determined by triangulating based on images from different imaging devices).

Block 310 may include causing the electrochromic device to be cleared responsive to determining that the sun position is to be obstructed (e.g., by one or more clouds and/or buildings, etc.) for a threshold amount of time.

In some embodiments, an electrochromic device takes about 10 seconds to about 2 minutes to change from one tint level to another tint level (e.g., clear to tinted). The processing logic may cause the tint level to be changed responsive to determining, based on the cloud movement data, that the sun is to be obstructed for a threshold amount of time or that the sun is to be unobstructed for a threshold amount of time. The threshold amount of time may be at least a change time of about 10 seconds to about 2 minutes to change the tint level of the electrochromic device. The processing logic may start changing a tint level of an electrochromic device so that the particular tint level is reached before the sky condition (e.g., tinted before the sun is unobstructed, etc.).

In some embodiments, the processing logic identifies illuminance data received from an illuminance sensor of a sky sensor 201. The images may be captured by an imaging device (e.g., camera sensor) of the sky sensor 201. The causing of the tint level to be controlled may be further based on the illuminance data (e.g., vertical illuminance calculation, bright sky calculation, bright sky glare). In some embodiments, the processing logic may determine direct normal illuminance (DNE) data based on the illuminance data and the images. Block 310 may be further based on the DNE data.

If the predicted cloud movement indicates that the sun will be obstructed and the illuminance data indicates less than a threshold amount of illuminance is coming through the electrochromic device when the sun is obstructed, then the processing logic may cause the electrochromic device to be cleared. If the predicted cloud movement indicates that the sun will not be obstructed and the illuminance data indicates less than a threshold amount of illuminance is coming through the electrochromic device when the sun is not obstructed, then the processing logic may cause the electrochromic device to be cleared. If the illuminance data indicates greater than a threshold amount of illuminance is coming through the electrochromic device when the sun is obstructed and/or unobstructed, then the processing logic may cause the electrochromic device to be tinted.

In some embodiments, different clouds (e.g., different types of clouds, different heights of clouds, clouds of different transmissivities) provide different types of illuminance. The illuminance sensor may provide an illuminance value. The processing logic may determine based on the illuminance value and the predicted cloud movement how to cause the tint level of the electrochromic device to be controlled.

Figure 4C:
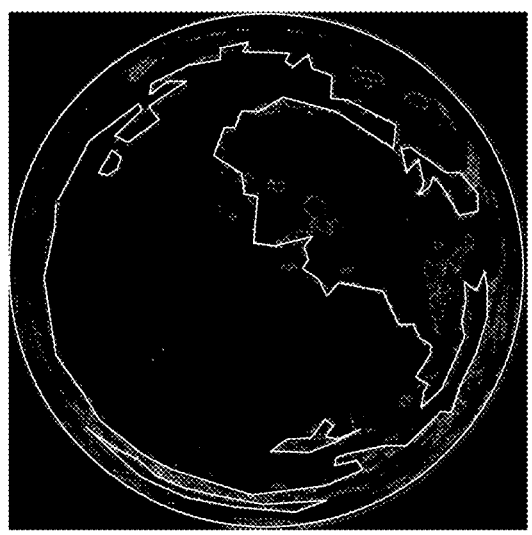
Figure 4A:
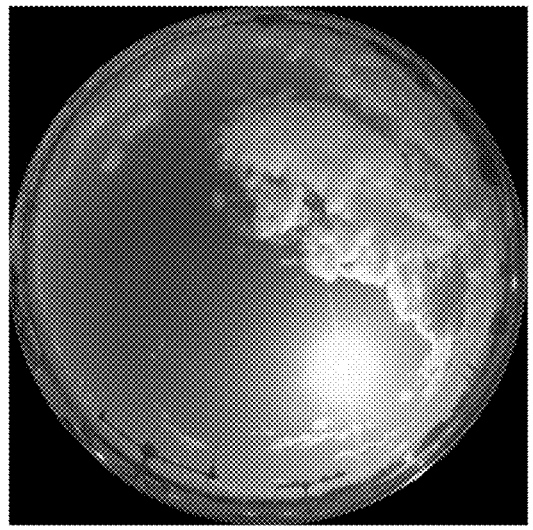

FIGS. 4A-C are images 400A-C used with controlling an electrochromic device, according to certain embodiments.

Referring to FIG. 4A, image 400A may be a fisheye image of the sky conditions. In some embodiments, image 400A is a high-dynamic range (HDR) image. In some embodiments, image 400A is a low dynamic range (LDR) image. Image 400A may be an auto-exposure, fisheye image.

Referring to FIG. 4B, image 400B may be generated from image 400A by isolating cloud pixels from sky pixels. In some embodiments, image 400B is a cloud mask from image 400A (e.g., HDR image).

Referring to FIG. 4C, image 400C may be generated from image 400B by determining the edges of the clouds. Image 400C may be used to determine cloud-edge to cloud-area ratio. Image 400C may have a cloud area/edge ratio of about 0.05. In some embodiments, cloud-edge to cloud-area ratio can be used to characterize clouds. In some embodiments, particular clouds (e.g., smaller than a threshold size, clouds with a high transmission in direct solar) are disregarded (e.g., they will not be blocking the sun for long if at all).

FIGS. 5A-F are images 500A-F used with controlling an electrochromic device, according to certain embodiments.

Images 500A-C are a series of auto-exposure, fisheye, LDR images that are captured at a set frequency between captures (e.g., 3 seconds). For example, image 500A may be captured at 00:00:00, image 500B may be captured at 00:00:03, and image 500C may be captured at 00:00:06. Images 500D-F are undistorted (e.g., flattened) images 500A-C(e.g., fisheye, LDR images) by projecting pixels onto a rectilinear plane. This removes parallax effects near fisheye horizon to allow optical flow analysis routine to calculate cloud movement and speed more accurately.

FIGS. 6A-D are images 600A-D used with controlling an electrochromic device, according to certain embodiments. Images 600A-D may be a series of images captured over time. For example, image 600A may be captured at 00:00:03, image 600B may be captured at 00:00:06, image 600C may be captured at 00:00:09, and image 600D may be captured at 00:00:12. The cloud speed and direction may be calculated (e.g., using Lucas-Kanade optical flow method) by tracking similar feature points 610 between each image frame. For images 600A-D, the direction may be determined to be 138 degrees and the speed may be determined to be 0.46 pixels per second based on the feature points 610. The similar feature points 610 may be located at the edges of the clouds.

FIG. 7 illustrates pixel data 700, according to certain embodiments. Pixel data 700 illustrates a transformed cloud mask and forecasting vectors. Pixel data 700 includes a sun position 702, cloud direction arrow 704, and vector shapes 710A. The sun position 702 may be determined based on a sun map or based on one or more images. Cloud direction arrow 704 may be determined based on tracking feature points 610 of FIGS. 6A-D. For example, a feature point line may be generated between a feature point 610 from one image and the same feature point 610 in another image. The cloud direction arrow 704 may have the same slope as the feature point line. The cloud direction arrow 704 may point in the direction from the feature point 610 in an older image towards the feature point 610 in the newer image.

As shown in FIG. 7, vector shape 710A may have a first distal end at the sun position 702 and a second distal end extended away from the sun position 702 in the opposite direction of the cloud direction arrow. As also shown in FIG. 7, vector shape 710B may have a first distal end proximate the second distal end of the vector shape 710A and a second distal end that extended away from the first distal end. The vector shapes 710 may form a line away from the sun position 702 in a direction opposite from the cloud direction arrow 704

Vector shape 710A (e.g., 1 minute forecast vector) may be used to predict 0% of the sun being covered by clouds in 1 minute. Vector shape 710B (e.g., 2 minute forecast vector) may be used to predict 72% of the sun being covered by clouds in 2 minutes. Vector shape 710C (e.g., 3 minute forecast vector) may be used to predict 91% of the sun being covered by clouds in 3 minutes. Vector shape 710D (e.g., 4 minute forecast vector) may be used to predict 74% of the sun being covered by clouds in 4 minutes. Vector shape 710E (e.g., 5 minute forecast vector) may be used to predict 61% of the sun being covered by clouds in 5 minutes.

Image 700 may include a cloud mask for an image of sky conditions. Each cloud mask image (e.g., image 400B of FIG. 4B) may be flattened (e.g., project pixels onto a rectilinear plane). The cloud mask may be used to generate speed and direction vector shapes 710 (e.g., vector boxes, vector conical shapes, etc.) starting from the sun position 702 and in a direction 180 degrees from the angle of cloud direction arrow 704. Each vector shape 710 represents a predetermined time event after the time when the image associated with pixel data 700 was captured (e.g., in 3 minutes, 91% of the sun with be obstructed clouds). Length and distance from sun position 702 of each direction vector shape 710 correlates to the calculated cloud speed (e.g., pixels/second) and the forecasting time event frequency (e.g., at 1-minute intervals). The width of the vector shapes may be a fixed value.

The percent of cloud pixels in each vector shape 710 may be calculated corresponding to a specific forecasting time event. The results may be used for forecasting a change in cloud conditions that would trigger a change in electrochromic device tint state.

If the percentage of cloud pixels within the time-vector shape 710 matching the time it takes for the electrochromic device to change tint levels is greater or less than the current conditions by a predetermined amount, then the electrochromic device should change tint states in anticipation of changing conditions (e.g., assuming change in condition is also forecasted to be persistent for a predetermined period beyond).

In the example illustrated in FIG. 7, the under current conditions of the electrochromic device may be in a dark tinted state for reducing direct sun transmission. If the electrochromic device uses 2 minutes to change tint states, then forecasting 2 minutes out shows 91% cloud coverage (e.g., vector shape 710C) approaching the sun, with proceeding time events showing persistent cloud coverage continuing for at least 2 more minutes out. The forecast suggests that the electrochromic device could begin clearing to a lighter tint state in anticipation of clouds obscuring the sun.

Figure 8:
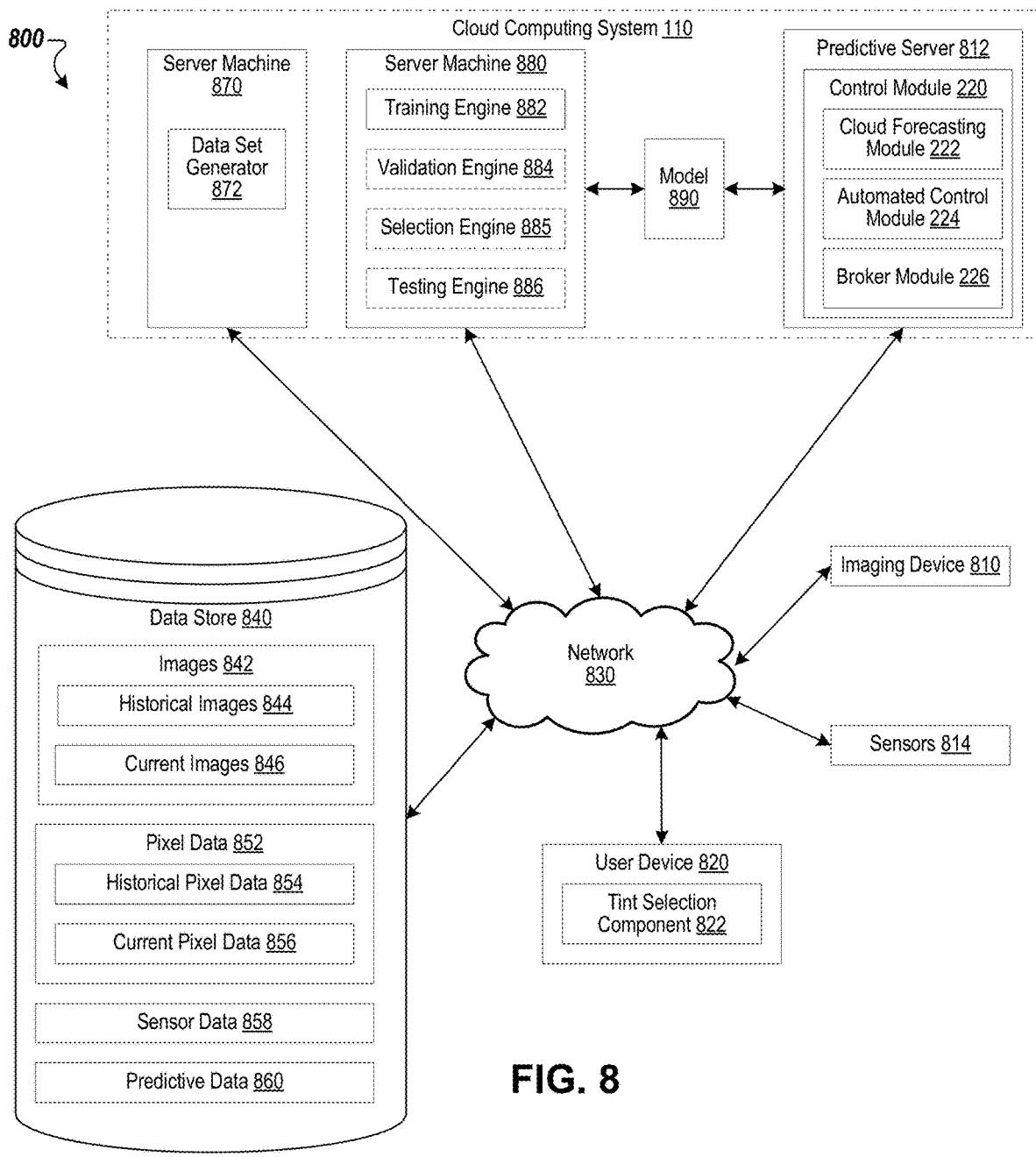
FIG. 8 is a block diagram illustrating an exemplary system for control of an electrochromic device, according to certain embodiments.

FIG. 8 is a block diagram illustrating an exemplary system 800 (exemplary system architecture) for control of EC windows 130 (e.g., electrochromic devices), according to certain embodiments. The system 800 includes a user device 820, a predictive server 812 (e.g., to generate predictive data 860, etc.), and a data store 840. The predictive server 812 may be part of a cloud computing system 110. The cloud computing system 110 may further include server machines 870 and 880. In some embodiments, the cloud computing system 110 may use a machine learning model 890 for automated control of EC windows 130. In some embodiments, an edge device (e.g., gateway 106) may use a machine learning model 890 for automated control of EC windows 130.

The user device 820, predictive server 812, data store 840, server machine 870, and server machine 880 may be coupled to each other via a network 830 for generating predictive data 860 (e.g., predicted cloud movement) used to automatically adjust a tinting level of an electrochromic device.

In some embodiments, network 830 is a public network that provides user device 820 with access to the predictive server 812, data store 840, and other publically available computing devices. In some embodiments, network 830 is a private network that provides user device 820 access to data store 840, and other privately available computing devices. Network 830 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The user device 820 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The user device 820 may include a tint selection component 822 (e.g., dashboard web app 140, dashboard mobile app 142). The user device 820 may (e.g., via tint selection component 822) select a tint level for one or more electrochromic devices. For example, tint selection component 822 may be a computer application or a mobile application used to select a tint for electrochromic windows for a particular room, area, or building. In some embodiments, tint selection component 822 is a tint selector 120.

Data store 840 may be a memory (e.g., random access memory), a drive (e.g., a hard drive, a flash drive), a database system, or another type of component or device capable of storing data. Data store 840 may include multiple storage components (e.g., multiple drives or multiple databases) that may span multiple computing devices (e.g., multiple server computers). The data store 840 may store images 842 (e.g., historical images 844, current images 846), pixel data 852 (e.g., historical pixel data 854, current pixel data 856), sensor data 858, and predictive data 860. The historical images 844 and historical pixel data 854 may be historical data (e.g., at least a portion for training the machine learning model 890). The current images 846 and current pixel data 856 may be current data. Current images 846 may be input into the trained machine learning model 890, subsequent to the historical data, for which predictive data 860 is to be generated (e.g., for automatic predicting of cloud movement for automatic selection of tinting states). The current pixel data 856 may also be current data (e.g., for re-training the trained machine learning model).

Images 842 may be received from one or more imaging devices 810. An imaging device 810 may be a sky sensor 201 mounted to a building (e.g., mounted to a roof of a building). The imaging device 810 may be located proximate an electrochromic device that is to be controlled (e.g., on the same building, in the electrochromic device, on the electrochromic device, on a proximate building, etc.). The imaging device 810 may be located above a building that includes the electrochromic device (e.g., the imaging device 810 may be located in a satellite).

The images 842 may be of sky conditions proximate the electrochromic device. For example, an imaging device 810 located on a roof of a building that includes the electrochromic device may capture images 842 of the sky conditions (e.g., sky, clouds, etc.) viewable from the electrochromic device (e.g., from inside the interior space looking out the electrochromic device).

Sensor data 858 may include data received from sensors 814. Sensors 814 may be one or more of the data sources in FIGS. 1 and/or 2 (e.g., occupancy sensor 122, tint selector 128, building sensor 124, exterior sensor 216, interior sensor 206, etc.). Sensor data 858 may include illuminance data received from an illuminance sensor. Sensor data 858 may be used to select a tinting state of an EC window 130. The sensor data 858 may include sensor values received over a period of time.

Sensor data 858 may be associated with EC window 130 properties. In some embodiments, the sensor data 858 may be associated with the amount of light that goes through the EC window 130 during or subsequent to directing the current tinting state to correspond to a first tint level (e.g., causing a first amount of electric charge to enter the EC window 130). Images 842 and sensor data 858 may be received from a sky sensor 201 of FIGS. 2B-C.

In some embodiments, the cloud computing system 110 may generate predictive data 860 using supervised machine learning (e.g., using a labeled data set, using historical pixel data 854 associated with historical images 844, etc.). In some embodiments, the cloud computing system 110 may generate predictive data 860 using semi-supervised learning (e.g., semi-supervised data set, a portion of the data is labeled, etc.). In some embodiments, the cloud computing system 110 may generate predictive data 860 using unsupervised machine learning (e.g., unlabeled data set, etc.). Labeled data sets may be used to train supervised machine learning models and unlabeled data sets may be used to train unsupervised learning models. Semi-supervised learning models may be a combination of supervised and unsupervised training models and/or semi-supervised learning models may be trained using partially-labeled data sets.

In some embodiments, the system may provide self-learning or self-adjusting corrective action that adapts with the data and state of the EC window. For example, if tint levels do not correspond to actual cloud movement, the system adjusts the compensating inputs (e.g., via re-training of a trained machine learning model based on updated images and/or pixel data). In some embodiments, the system uses transfer learning. For example, a machine learning model is trained on a related dataset and is enhanced (e.g., re-trained) by feeding images and/or pixel data from the current system. The trained machine learning model is more accurate with a small data set (e.g., from the current system) sooner (e.g., by also being trained by related data from a different system). The trained machine learning model may be used to detect flaws in image data and/or anomalies in time-series data.

In some embodiments, the predictive data 860 may be indicative of predictive cloud movement associated with images 842. In some embodiments, the predictive data 860 can include a cloud mask, cloud pixels and/or sky pixels, etc.

In some embodiments, the machine learning model 890 may be trained based on data input of historical images 844 (e.g., unsupervised learning). The machine learning model may group sets of historical images 844. For example, historical images 844 that indicate less than a threshold percentage of cloud pixels in images (e.g., less than a threshold amount of clouds covering the sun) may be grouped and associated with a lower tinting state. Images 844 that indicate at least a threshold amount cloud pixels in the images 842 (e.g., at least a threshold amount of clouds covering the sun) may be grouped and associated with a higher tinting state. The trained machine learning model 890 may receive input of current images 846 and may provide predictive data 860. The predictive data 860 may indicate the current images 846 are associated with a particular grouping that is associated with a particular tinting state. The predictive data 860 may indicate whether the tinting level of an EC window 130 is to be adjusted based on current images 846.

In some embodiments, the machine learning model 890 may be trained based on data input of historical images 844 and target output of historical pixel data 854 (e.g., supervised learning). The trained machine learning model 890 may receive input of current images 846 and may provide predictive data 860. Based on the predictive data 860, the user device 820 (e.g., via tint selection component 822) may cause a tinting level adjustment to be performed. In some embodiments, the predictive data 860 indicates a ranking of potential target tinting levels.

In some embodiments, cloud computing system 110 may input current images 846 (e.g., and historical pixel data 856) into one or more machine learning models 890 (e.g., ensemble machine learning model). In some embodiment, the machine learning model 890 is continuously re-trained using current images 846 and current pixel data 856 (e.g., received from a user). In some embodiments, a current pixel data 856 may not be correlated with any historical images 844.

In some embodiments, the machine learning models 890 may additionally be trained based on an obstruction map (e.g., a map indicating obstructions to determine an amount of sunlight that will be entering the building) along with historical images 844, and historical pixel data 854. The machine learning models 890 may continuously be trained based on current images 846 and current pixel data 856.

In some embodiments, the machine learning models 890 may be trained using input from one or more wearable devices indicating occupant comfort levels (and occupant location in the room). Occupants may also manually input comfort level feedback using a user device (e.g., user device 820). The machine learning models 890 may provide one or more outputs indicating tinting levels for the EC window 130 that maximizes user comfort.

In some embodiments, the machine learning models 890 may be trained using energy consumption data. The energy consumption data may be correlated with historical images 844, historical pixel data 854, and automated tint selection data. For example, certain tinting levels corresponding to certain historical images 844 may provide for optimal energy savings. The machine learning models 890 may thus receive current images 846 as an input and output one or more potential energy saving tinting levels. User comfort levels may also be considered and may be balanced against energy savings.

The predictive server 812, server machine 870, and server machine 880 may each include one or more computing devices such as a rackmount server, a router computer, a server computer, a personal computer, a mainframe computer, a laptop computer, a tablet computer, a desktop computer, graphics processing unit (GPU), accelerator application-specific integrated circuit (ASIC) (e.g., tensor processing unit (TPU)), etc.

The predictive server 812 may include a control module 220. The control module 220 may include a cloud forecasting module 222, automated control module 224, and a broker module 226. In some embodiments, the control module 220 may retrieve current images 846 from the data store 840 and generate output (e.g., predictive data 860) for adjusting a tinting state based on the current images 846. In some embodiments, the control module 220 may use a trained machine learning model 890 to determine the output for a target tinting level of the EC window 130 based on the current images 846. The trained machine learning model 890 may be trained using the historical images 844 and/or historical pixel data 854 to learn patterns (e.g., relating images 842 to pixel data 852).

In some embodiments, the user device 820 may store current images 846 (e.g., images received after the receiving of the historical images 844, images received after training of the model 890, images for which there is no pixel data) in the data store 840 and the control module 220 may retrieve the current images 846 from the data store 840. In some embodiments, the predictive server 812 may store output (e.g., predictive data 860) of the trained machine learning model 890 in the data store 840 and the user device 820 may retrieve the output from the data store 840.

In some embodiments, cloud computing system 110 further includes server machine 870 and server machine 880. Server machine 870 includes a data set generator 872 that is capable of generating data sets (e.g., a set of data inputs and a set of target outputs) to train, validate, and/or test a machine learning model 890. In some embodiments, the data set generator 872 may partition the historical data (e.g., historical images 844 and historical pixel data 854) into a training set (e.g., sixty percent of the historical images 844 and historical pixel data 854), a validating set (e.g., twenty percent of the historical images 844 and historical pixel data 854), and a testing set (e.g., twenty percent of the historical images 844 and historical pixel data 854). In some embodiments, the machine learning model 890 may be validated using one or more types of validation, such as Cross Validation, Leave One Out Cross-Validation (LOOCV), K-Folds Cross Validation (e.g., a 5-fold train/test split), or the like. In some embodiments, the cloud computing system 110 (e.g., via control module 220) generates multiple sets of features. For example, a first set of features may correspond to a first set of images (e.g., from a first set of imaging devices, from a first period of time, etc.) that correspond to each of the data sets (e.g., training set, validation set, and testing set) and a second set of features may correspond to a second set of images (e.g., from a second set of imaging devices different from the first set of imaging devices, second period of time different from the first period of time, etc.) that correspond to each of the data sets.

The data (e.g., images 842, pixel data 852) may be partitioned to generate partitioned data sets (e.g., training set, testing set, validation set, etc.). Model evaluation may be performed using the partitioned data sets (e.g., training set, testing set, validation set) to perform model tuning. A model may be selected (e.g., select the best performing model or use an ensemble method). Accuracy may be one of many outputs (e.g., scores) used to measure performance of a model. Each model and what is done with the model may change which measurement is used (e.g., F1 score, confusion matrix, means squared error, etc.). Which measurement is used may depend on the model and the use. The scores are compared and evaluated to select the model that meets the needs. After the model is selected, the model may be deployed.

Server machine 880 may include a training engine 882, a validation engine 884, selection engine 885, and/or a testing engine 886. An engine (e.g., training engine 882, a validation engine 884, selection engine 885, and a testing engine 886) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 882 may be capable of training a machine learning model 890 using one or more sets of features associated with the training set from data set generator 872. The training engine 882 may generate multiple trained machine learning models 890, where each trained machine learning model 890 corresponds to a distinct set of features of the training set (e.g., images from one or more imaging devices). For example, a first trained machine learning model may have been trained using all features (e.g., images X1-X5), a second trained machine learning model may have been trained using a first subset of the features (e.g., images X1, X2, X4), and a third trained machine learning model may have been trained using a second subset of the features (e.g., images X1, X3, X4, and X5) that may partially overlap the first subset of features.

The validation engine 884 may be capable of validating a trained machine learning model 890 using a corresponding set of features of the validation set from data set generator 872. For example, a first trained machine learning model 890 that was trained using a first set of features of the training set may be validated using the first set of features of the validation set. The validation engine 884 may determine an accuracy of each of the trained machine learning models 890 based on the corresponding sets of features of the validation set. The validation engine 884 may discard trained machine learning models 890 that have an accuracy that does not meet a threshold accuracy. In some embodiments, the selection engine 885 may be capable of selecting one or more trained machine learning models 890 that have an accuracy that meets a threshold accuracy. In some embodiments, the selection engine 885 may be capable of selecting the trained machine learning model 890 that has the highest accuracy of the trained machine learning models 890.

The testing engine 886 may be capable of testing a trained machine learning model 890 using a corresponding set of features of a testing set from data set generator 872. For example, a first trained machine learning model 890 that was trained using a first set of features of the training set may be tested using the first set of features of the testing set. The testing engine 886 may determine a trained machine learning model 890 that has the highest accuracy of all of the trained machine learning models based on the testing sets.

In some embodiments, the data may be partitioned into two or three parts (e.g., training data set, testing data set, and/or validation data set). The model may be trained using the training data set. How well the model learned may be determined by comparing the model against the test data set. This may be performed multiple times, tuning the model and balancing over-fitting and under-fitting to the data. The trained model may be tested against a validation data set to test the model on data that the model has not been exposed (e.g., on which the model has not been trained). Inputting non-labeled data (e.g., unsupervised training) into the model may be a final validation of the model simulating real-world model performance. For model selection, several models may be used (e.g., each model may have different sets of strengths and/or weaknesses) to find a counterbalancing model. Each of the models may be tested with different methods (e.g., training, validating, testing, etc.) and the top-performing model may be selected or multiple models (e.g., the top-performing models) may be used by averaging scores (e.g., weighted averaging).

The machine learning model 890 may refer to the model artifact that is created by the training engine 882 using a training set that includes data inputs and corresponding target outputs (correct answers for respective training inputs). Patterns in the data sets can be found that map the data input to the target output (the correct answer), and the machine learning model 890 is provided mappings that captures these patterns. The machine learning model 890 may use one or more of the following methods: supervised, unsupervised, or semi-supervised machine learning methods. This may include, but is not limited to, the following: Support Vector Machine (SVM), Radial Basis Function (RBF), clustering algorithms, k-nearest neighbor algorithm (k-NN), linear regression, linear regression, multi-variable regression, random forest, random cut forest, random forest regression, neural networks (e.g., artificial neural network), convolutional neural network (CNN), recursive CNN, deep neural nets, ensemble machine learning (e.g., combination of models), etc. With the collection of data at multiple points, the machine learning model 890 may be used to assist in cloud forecasting and automated control to reduce costs (e.g., lighting energy, heating energy, cooling energy, bandwidth used, processor overhead, energy consumption, etc.).

Control module 220 may provide current images 846 to the trained machine learning model 890 and may run the trained machine learning model 890 on the input to obtain one or more outputs. The control module 220 may be capable of determining (e.g., extracting) predictive data 860 from the output of the trained machine learning model 890 and may determine (e.g., extract) confidence data from the output that indicates a level of confidence that the predictive data 860 corresponds to pixel data 852 (e.g., that corresponds to the current images 846). The control module 220 or tint selection component 822 may use the confidence data to decide whether to cause a tinting level adjustment based on the predictive data 860.

For purpose of illustration, rather than limitation, aspects of the disclosure describe the training of a machine learning model using historical images 844 (and historical pixel data 854) and inputting current images 846 into the trained machine learning model to determine predictive data 860. In other implementations, a heuristic model or rule-based model (e.g., comparing images and/or sensor data to threshold values) is used to determine predictive data 860 (e.g., without using a trained machine learning model). Control module 220 may monitor historical images 844 (and historical pixel data 854). Any of the information described with respect to data inputs 910 of FIG. 9 may be monitored or otherwise used in the heuristic or rule-based model.

In some embodiments, the functions of user device 820, predictive server 812, server machine 870, and server machine 880 may be provided by a fewer number of machines. For example, in some embodiments server machines 870 and 880 may be integrated into a single machine, while in some other embodiments, server machine 870, server machine 880, and predictive server 812 may be integrated into a single machine. In some embodiments, user device 820 and predictive server 812 may be integrated into a single machine.

In general, functions described in one embodiment as being performed by user device 820, predictive server 812, server machine 870, and server machine 880 can also be performed on predictive server 812 in other embodiments, if appropriate. In addition, the functionality attributed to a particular component can be performed by different or multiple components operating together. For example, in some embodiments, the predictive server 812 may determine a pixel data 852 and/or tinting state for an EC window 130 based on the predictive data 860. In another example, user device 820 may determine the predictive data 860 based on output from the trained machine learning model 890.

In addition, the functions of a particular component can be performed by different or multiple components operating together. One or more of the predictive server 812, server machine 870, or server machine 880 may be accessed as a service provided to other systems or devices through appropriate APIs.

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 9:
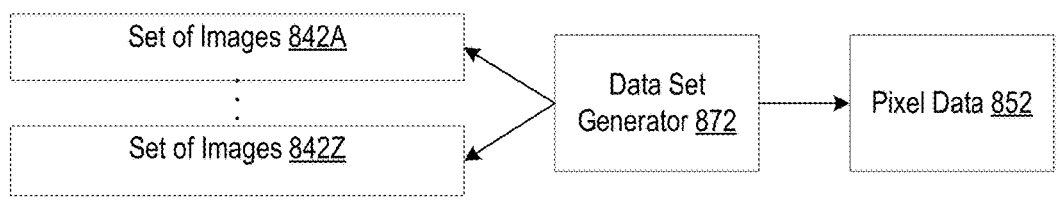
FIG. 9 is an example data set generator to create data sets for a machine learning model, according to certain embodiments.

FIG. 9 is an example data set generator 872 to create data sets for a machine learning model 890 using images 842 and pixel data 852, according to certain embodiments. System 900 of FIG. 9 shows data set generator 872, data inputs 910, and target output 920.

In some embodiments, data set generator 872 generates a data set (e.g., training set, validating set, testing set) that includes one or more data inputs 910 (e.g., training input, validating input, testing input) and one or more target outputs 920 that correspond to the data inputs 910. The data set may also include mapping data that maps the data inputs 910 to the target outputs 920. Data inputs 910 may also be referred to as "features," "attributes," or information." In some embodiments, data set generator 872 may provide the data set to the training engine 882, validating engine 884, or testing engine 886, where the data set is used to train, validate, or test the machine learning model 890. Some embodiments of generating a training set may further be described with respect to FIG. 11A.

In some embodiments, data set generator 872 generates the data input 910 and target output 920. In some embodiments, data inputs 910 may include one or more sets of images 842 (e.g., historical images 844 of FIG. 8). The data inputs 910 may include individual unit specific data (e.g., data specific to a particular EC window 130). Images 842 may include one or more of images from one or more imaging devices, combination of images from one or more imaging devices, patterns from images from one or more imaging devices, etc. Target output may include pixel data 852 (e.g., historical pixel data 854).

In some embodiments, data set generator 872 may generate a first data input corresponding to a first set of images 842A (e.g., first historical images 844) to train, validate, or test a first machine learning model and the data set generator 872 may generate a second data input corresponding to a second set of images 842B (e.g., second historical images 844) to train, validate, or test a second machine learning model.

In some embodiments, the data set generator 872 may discretize (e.g., segment) one or more of the data input 910 or the target output 920 (e.g., to use in classification algorithms for regression problems). Discretization (e.g., segmentation via a sliding window) of the data input 910 or target output 920 may transform continuous values of variables into discrete values. In some embodiments, the discrete values for the target output 920 indicate discrete pixel data (e.g., discrete cloud pixels and/or sky pixels, discrete cloud edges, etc.).

In some embodiments, subsequent to generating a data set and training, validating, or testing machine learning model 890 using the data set, the machine learning model 890 may be further trained, validated, or tested (e.g., current images 846 and current pixel data 856 of FIG. 8) or adjusted (e.g., adjusting weights associated with input data of the machine learning model 890, such as connection weights in a neural network).

Figure 10:
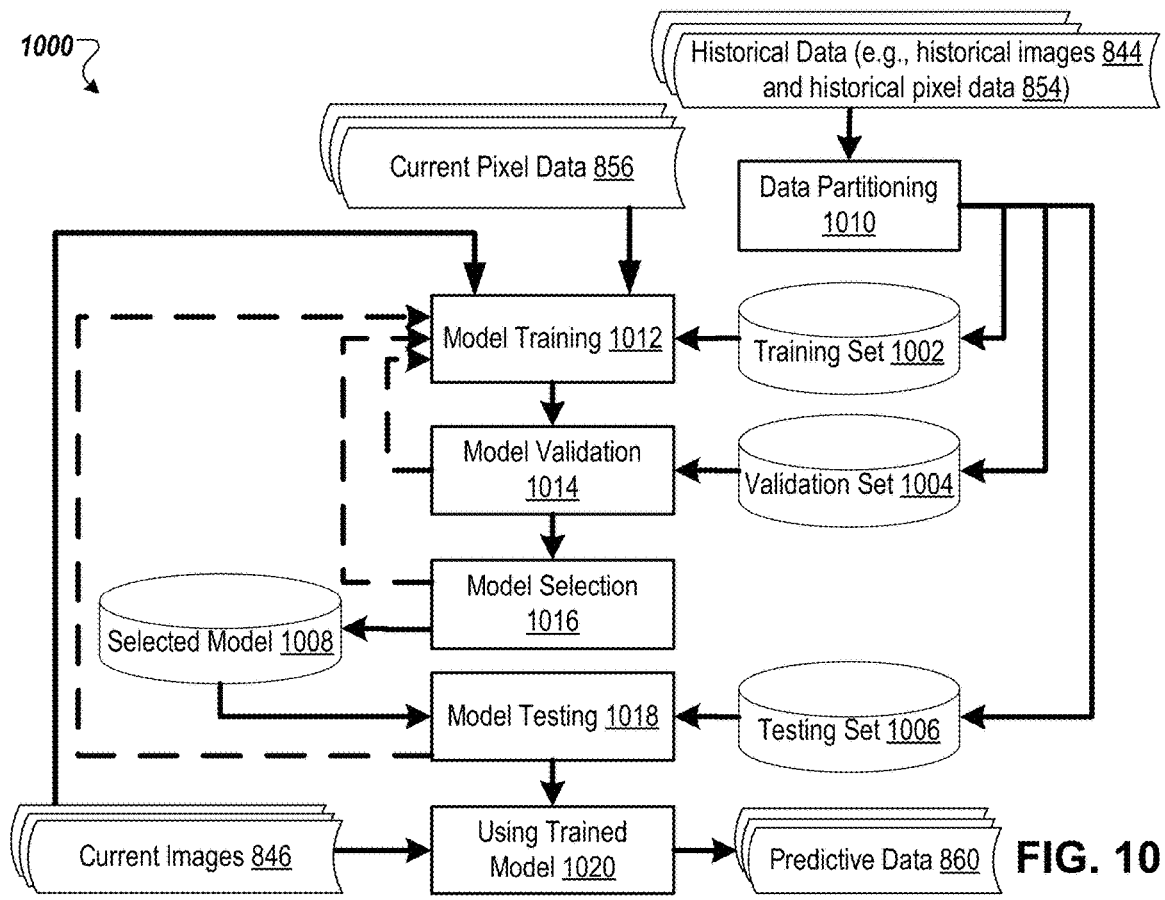
FIG. 10 is a block diagram illustrating a system for generating predictive data, according to certain embodiments.

FIG. 10 is a block diagram illustrating a system 1000 for generating predictive data 860, according to certain embodiments. The system 1000 may be used to determine pixel data and/or a tinting state for an EC window 130 based on the predictive data 860.

At block 1010, the system 1000 (e.g., cloud computing system 110 of one or more of FIG. 1, 2A, or 8) performs data partitioning (e.g., via data set generator 872 of server machine 870 of FIG. 8) of the historical images 844 (e.g., and historical pixel data 854) to generate the training set 1002, validation set 1004, and testing set 1006. For example, the training set may be 60% of the historical images 844 (e.g., and historical pixel data 854), the validation set may be 20% of the historical images 844 (e.g., and historical pixel data 854), and the testing set may be 20% of the historical images 844 (e.g., and historical pixel data 854). The system 1000 may generate a plurality of sets of features for each of the training set, the validation set, and the testing set. For example, if the historical data (e.g., historical images 844 and historical pixel data 854) includes features (e.g., images) derived from images from 20 imaging devices (e.g., imaging device 810 of FIG. 8), a first set of features may be images from imaging devices 1-10, a second set of features may be images from imaging devices 11-20, the training set may be time period 1-60, the validation set may be time period 61-80, and the testing set may be time period 81-100. In this example, the first set of features of the training set would be images from imaging devices 1-10 for time period 1-60.

At block 1012, the system 1000 performs model training (e.g., via training engine 882 of FIG. 8) using the training set 802. The system 1000 may train multiple models using multiple sets of features of the training set 1002 (e.g., a first set of features of the training set 1002, a second set of features of the training set 1002, etc.). For example, system 1000 may train a machine learning model to generate a first trained machine learning model using the first set of features in the training set (e.g., images from imaging devices 1-10 for time period 1-60) and to generate a second trained machine learning model using the second set of features in the training set (e.g., images from imaging devices 11-20 for time period 1-60). In some embodiments, the first trained machine learning model and the second trained machine learning model may be combined to generate a third trained machine learning model (e.g., ensemble model, a model that may be a better predictor than the first or the second trained machine learning model on its own). In some embodiments, sets of features used in comparing models may overlap (e.g., first set of features being images from imaging devices 1-15 and second set of features being images from imaging devices 8-20). In some embodiments, hundreds of models may be generated including models with various permutations of features and combinations of models.

At block 1014, the system 1000 performs model validation (e.g., via validation engine 884 of FIG. 8) using the validation set 1004. The system 1000 may validate each of the trained models using a corresponding set of features of the validation set 1004. For example, system 1000 may validate the first trained machine learning model using the first set of features in the validation set (e.g., images from imaging devices 1-10 for time period 61-80) and the second trained machine learning model using the second set of features in the validation set (e.g., images from imaging devices 11-20 for time period 61-80). In some embodiments, the system 1000 may validate hundreds of models (e.g., models with various permutations of features, combinations of models, etc.) generated at block 1012. At block 1014, the system 1000 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 1012 where the system 1000 performs model training using different sets of features of the training set. Responsive to determining that one or more of the trained models has an accuracy that meets a threshold accuracy, flow continues to block 1016. The system 1000 may discard the trained machine learning models that have an accuracy that is below the threshold accuracy (e.g., based on the validation set).

At block 1016, the system 1000 performs model selection (e.g., via selection engine 885 of FIG. 8) to determine which of the one or more trained models that meet the threshold accuracy has the highest accuracy (e.g., the selected model 1008, based on the validating of block 1014). Responsive to determining that two or more of the trained models that meet the threshold accuracy have the same accuracy, flow may return to block 1012 where the system 1000 performs model training using further refined training sets corresponding to further refined sets of features for determining a trained model that has the highest accuracy.

At block 1018, the system 1000 performs model testing (e.g., via testing engine 886 of FIG. 8) using the testing set 1006 to test the selected model 1008. The system 1000 may test, using the first set of features in the testing set (e.g., images from imaging devices 1-10 for time period 81-100), the first trained machine learning model to determine the first trained machine learning model meets a threshold accuracy (e.g., based on the first set of features of the testing set 1006). Responsive to accuracy of the selected model 1008 not meeting the threshold accuracy (e.g., the selected model 1008 is overly fit to the training set 1002 and/or validation set 1004 and is not applicable to other data sets such as the testing set 1006), flow continues to block 1012 where the system 1000 performs model training (e.g., retraining) using different training sets corresponding to different sets of features (e.g., images from different imaging devices). Responsive to determining that the selected model 1008 has an accuracy that meets a threshold accuracy based on the testing set 1006, flow continues to block 1020. In at least block 1012, the model may learn patterns in the historical images 844 and historical pixel data 854 to make predictions and in block 1018, the system 1000 may apply the model on the remaining data (e.g., testing set 1006) to test the predictions.

At block 1020, system 1000 uses the trained model (e.g., selected model 1008) to receive current images 846 and determines (e.g., extracts), from the output of the trained model, predictive data 860 (e.g., to determine predicted cloud movement) to adjust a tinting state (e.g., associated with the EC windows 130, etc.). In some embodiments, the current images 846 may correspond to the same types of features in the historical images 844 (e.g., images from the same imaging devices). In some embodiments, the current images 846 correspond to a same type of features as a subset of the types of features in historical images 844 that are used to train the selected model 808.

In some embodiments, current pixel data 856 is received and the model 1008 is re-trained based on the current images 846 and the current pixel data 856. In some embodiments, a new model is trained based on the current images 846 and the current pixel data 856.

In some embodiments, one or more of the operations 1010-1020 may occur in various orders and/or with other operations not presented and described herein. In some embodiments, one or more of operations 1010-1020 may not be performed. For example, in some embodiments, one or more of data partitioning of block 1010, model validation of block 1014, model selection of block 1016, or model testing of block 1018 may not be performed.

Figure 11A:
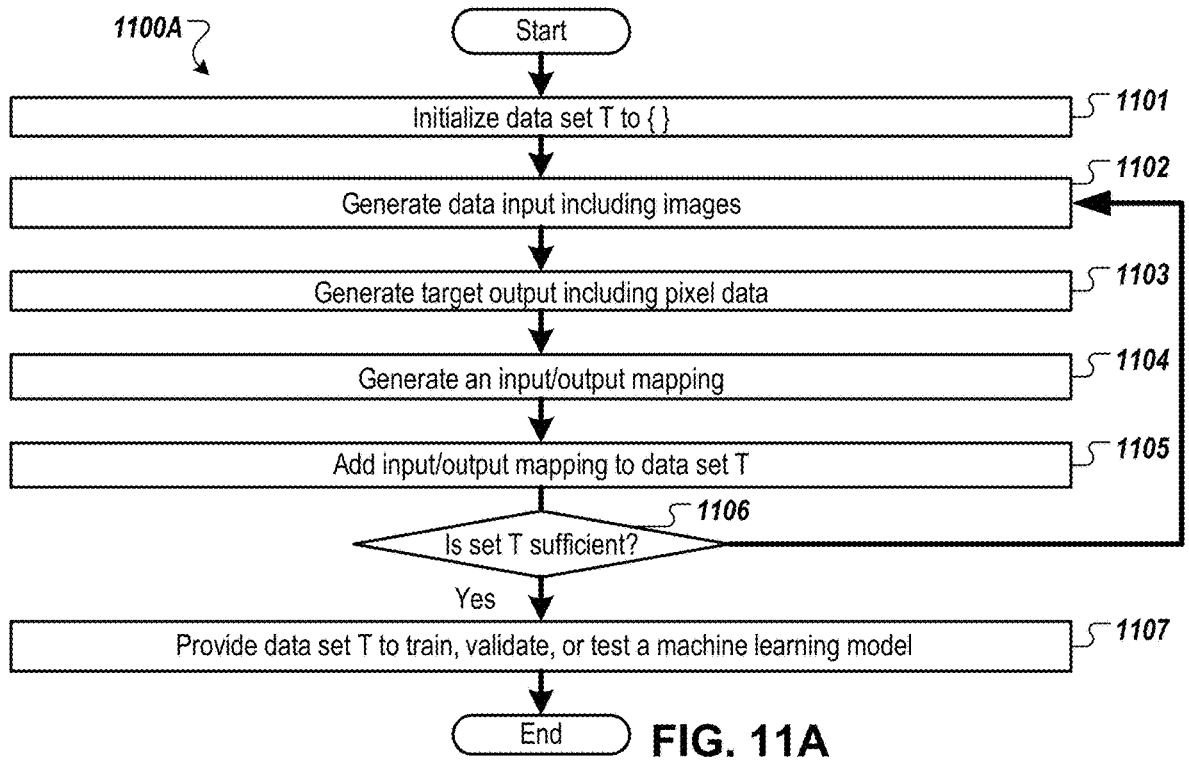
FIG. 11A-C are flow diagrams of methods associated with controlling tint level of an electrochromic device, according to certain embodiments.
Figure 11B:
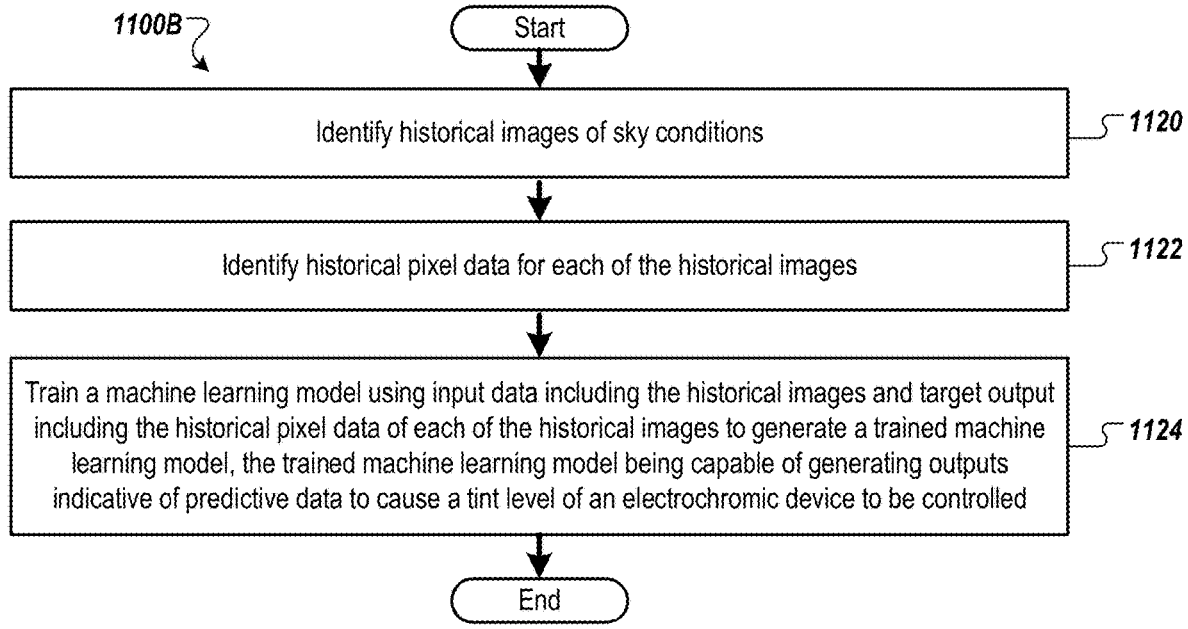
Figure 11C:
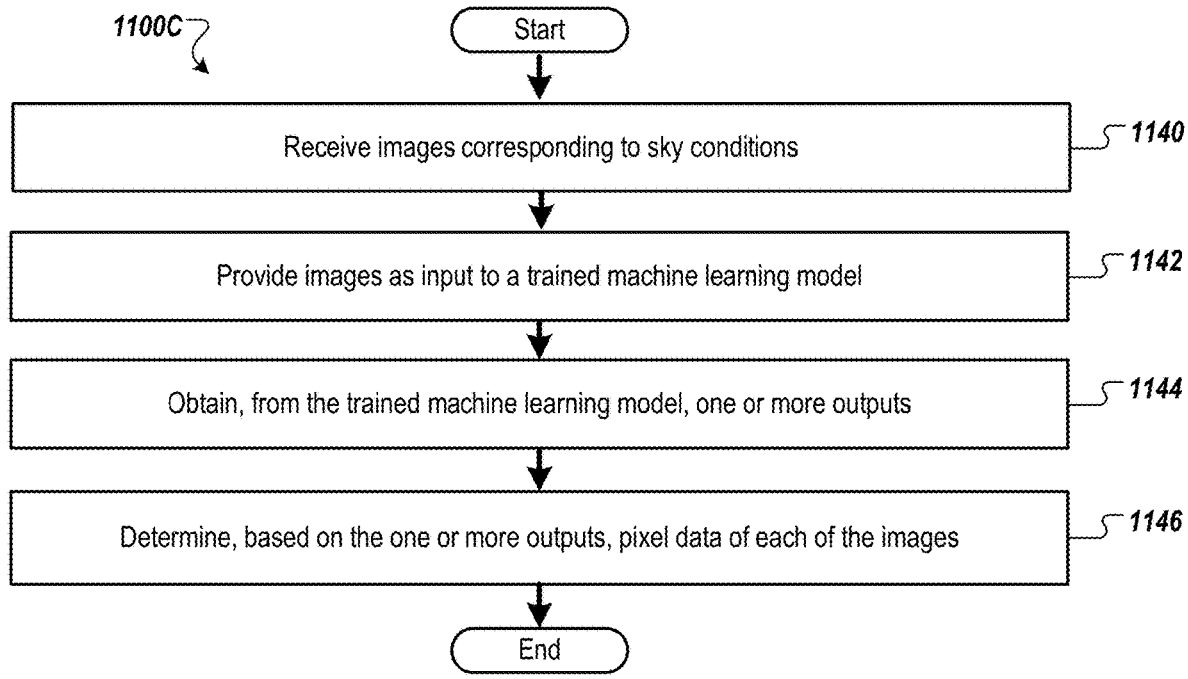

FIGS. 11A-C are flow diagrams of methods associated with predicting and selecting a tint level of an electrochromic device (e.g., EC window 130), according to certain embodiments. The methods 1100A-C can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 1100A-C are performed by the cloud computing system 110 of one or more of FIGS. 1, 2A, and/or 8. In some embodiments, the methods 1100A-C are performed by one or more server devices of the cloud computing system 110. In some embodiments, the methods 1100A-C are performed by a processing device of the cloud computing system 110 (e.g., a non-transitory machine-readable storage medium storing instructions which, when executed cause a processing device to perform methods 1100A-C). In some embodiments, the methods 1100A-C are performed by control module 220 of the cloud computing system 110. In some embodiments, one or more portions of methods 1100A-C are performed by one or more other components (e.g., gateway, etc.). For example, the server device may transmit instructions to the gateway and the gateway may use the instructions provide cloud forecasting and automated control of an EC window 130.

For simplicity of explanation, methods 1100A-C are depicted and described as a series of operations. However, operations in accordance with this disclosure can occur in various orders and/or concurrently and with other operations not presented and described herein. Furthermore, not all illustrated operations may be performed to implement methods 1100A-C in accordance with the disclosed subject matter. In addition, those skilled in the art will understand and appreciate that methods 1100A-C could alternatively be represented as a series of interrelated states via a state diagram or events.

FIG. 11A is a flow diagram of a method 1100A for generating a data set for a machine learning model for generating predictive data (e.g., predictive data 860 of FIG. 8), according to certain embodiments. Method 1100A may be performed by cloud computing system 110 (e.g., data set generator 872 of server machine 870 of FIG. 8).

Referring to FIG. 11A, at block 1101 of method 1100A, the processing logic initializes a training set T to an empty set.

At block 1102, the processing logic generates first data input (e.g., first training input, first validating input) that includes historical data (e.g., historical images 844 of FIG. 8). In some embodiments, the first data input may include a first set of features (e.g., first images) and a second data input may include a second set of features (e.g., second images) (e.g., as described with respect to FIG. 9).

At block 1103, the processing logic generates a first target output for one or more of the data inputs (e.g., first data input). The first target output may be historical pixel data (e.g., historical pixel data 854 of FIG. 8).

At block 1104, the processing logic optionally generates mapping data that is indicative of an input/output mapping. The input/output mapping (or mapping data) may refer to the data input (e.g., one or more of the data inputs described herein), the target output for the data input (e.g., where the target output identifies historical pixel data 854), and an association between the data input(s) and the target output.

At block 1105, processing logic adds the mapping data generated at block 1104 to data set T.

At block 1106, the processing logic branches based on whether data set T is sufficient for at least one of training, validating, and/or testing machine learning model (e.g., model 890 of FIG. 8). If so, execution proceeds to block 1107, otherwise, execution continues back at block 1102. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 1107, the processing logic provides data set T (e.g., to server machine 180) to train, validate, and/or test machine learning model 890. In some embodiments, data set T is a training set and is provided to training engine 882 of server machine 880 to perform the training. In some embodiments, data set T is a validation set and is provided to validation engine 884 of server machine 880 to perform the validating. In some embodiments, data set T is a testing set and is provided to testing engine 886 of server machine 880 to perform the testing. In the case of a neural network, for example, input values of a given input/output mapping (e.g., numerical values associated with data inputs 910) are input to the neural network, and output values (e.g., numerical values associated with target outputs 920) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 1107, machine learning model (e.g., machine learning model 890) can be at least one of trained using training engine 882 of server machine 880, validated using validating engine 884 of server machine 880, or tested using testing engine 886 of server machine 880. The trained machine learning model may be implemented by control module 220 (of predictive server 812) to generate predictive data 860 tint level prediction, selection, and adjustment for the electrochromic device.

In some embodiments, the data set includes data input and target output (e.g., labeled data, for supervised training). In some embodiments, the data set includes data input without target output (e.g., unlabeled data, for unsupervised training). The data set of data input may be used to train a machine learning model to identify groupings of images based on the data input (e.g., unsupervised training). In some embodiments, the data set includes labeled data and unlabeled data (e.g., for semi-supervised training). Semi-supervised training may utilize a data set where only some of the data was labeled (e.g., particular tinting level associated with certain conditions.). This labeled data is used to help identify groups that can also be labeled through the use of an unsupervised algorithm. The partially labeled data may be used to help train a supervised algorithm to see if the algorithm identifies other conditions that can also be labeled. In some embodiments, one or more trained machine learning models may be used (e.g., ensemble model) to determine whether the current images are indicative of predictive cloud movement. A first data set generated by method 1100A may be used to train a first machine learning model and a second data set generated by method 1100A may be used to train a second machine learning model (e.g., both to be used in an ensemble model). Feature aggregation and/or selection of data sets can be used to create different models.

FIG. 11B illustrates a method 1100B of training a machine learning model for controlling tint level of an electrochromic device (e.g., EC window 130).

Referring to FIG. 11B, at block 1120 of method 1100B, the processing logic identifies historical images of sky conditions.

At block 1122, processing logic identifies historical pixel data for each of the historical images. The historical pixel data may be user input of what portions of the historical images correspond to cloud pixels and/or sky pixels. The historical pixel data may include an outline of the clouds that meet a threshold size.

At block 1124, processing logic trains a machine learning model using input data including the historical images and target output including the historical pixel data of each of the historical images to generate a trained machine learning model. The trained machine learning model is capable of generating one or more outputs indicative of predictive data to cause a tint level of an electrochromic device to be controlled. In some embodiments, the predictive data is predictive pixel data indicative of predictive cloud movement (e.g., FIG. 7).

In some embodiments, the input data includes sensor data (e.g., illuminance data, temperature data, etc.) corresponding to the images. In some embodiments, the target output further includes an indication of overcast sky or clear sky.

In some embodiments, the processing logic trains a machine learning model using training data including data input including the historical images 844 without target output (e.g., unsupervised learning). The trained machine learning model may group sets of historical images 844. The trained machine learning model may determine predicted pixel data for different groupings of historical images 844 (e.g., via user input indicating pixel data for a particular grouping). In some embodiments, the processing logic trains a machine learning model using training data including data input including the images for points in time and target output including pixel data states for a subset of the points in time (e.g., semi-supervised learning). The trained machine learning model may determine groupings of historical images 844 and label the groupings (e.g., cloudy, clear sky, etc.) based on the pixel data for the subset of the points in time.

FIG. 11C illustrates a method 1100C of using a trained machine learning model to control tint level of an electrochromic device (e.g., EC window 130).

Referring to FIG. 11C, at block 1140 of method 1100C, the processing logic receives images corresponding to sky conditions. The images may be captured by a sky sensor 201 of FIGS. 2B-C. The images may be a series of images captured over a period of time (e.g., every 3 seconds for the past 1 minute). In some embodiments, the processing logic further receives sensor data (e.g., illuminance data from the sky sensor 201).

At block 1140, the processing logic provides the images as input to a trained machine learning model (e.g., trained machine learning model of block 1124 of FIG. 11B). In some embodiments, the processing logic further provides the sensor data (e.g., illuminance data) as input to the trained machine learning model. In some embodiments, the trained machine learning model is a CNN model or a region-based CNN.

At block 1142, the processing logic obtains, from the trained machine learning model, one or more outputs indicative of predictive data.

At block 1144, the processing logic determines, based on the predictive data, pixel data of each of the images to control tint level of an electrochromic device. In some embodiments, the pixel data is cloud pixels and/or sky pixels for each of the images. In some embodiments, the pixel data is a cloud mask (e.g., binary segmentation mask where cloud pixels are white and sky pixels are black) for each of the images. In some embodiments, the pixel data is predicted cloud movement based on the images. In some embodiments, the pixel data includes one or more of cloud direction arrow 704 or vector shapes 710 (e.g., pixel data 700 of FIG. 7). In some embodiments, the processing logic causes one or more electrochromic devices to be controlled based on the predictive data.

Figure 12:
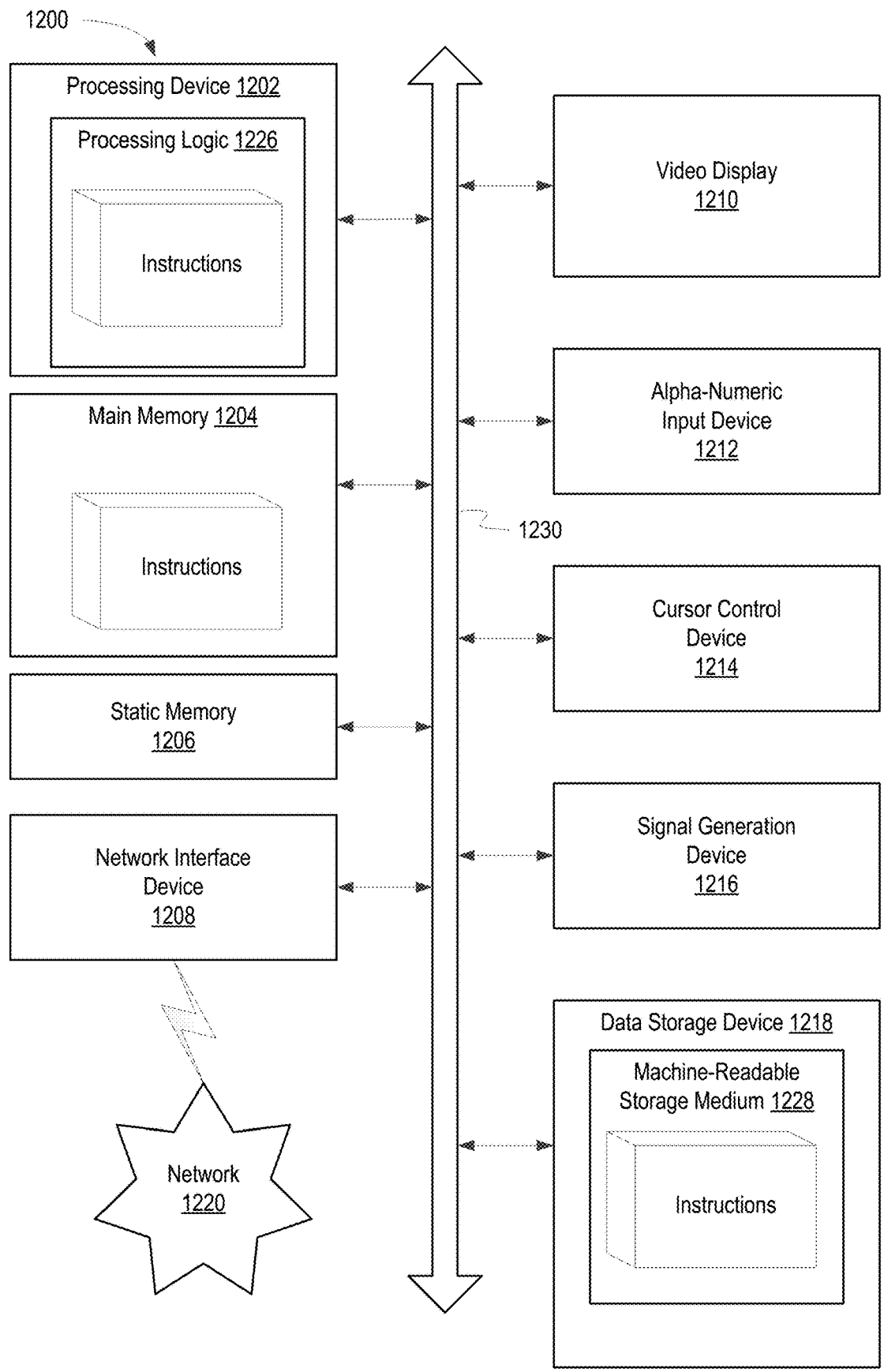
FIG. 12 illustrates a diagrammatic representation of a machine in the example form of a computer system including a set of instructions executable by a computer system to control an electrochromic device according to any one or more of the methodologies discussed herein.

FIG. 12 illustrates a diagrammatic representation of a machine in the example form of a computer system including a set of instructions executable by a computer system 1200 to control an electrochromic device according to any one or more of the methodologies discussed herein. In some embodiments, computer system 1200 is a server device of a cloud computing system (e.g., cloud computing system 110 of one or more of FIG. 1, 2A, or 8). In some embodiments, computer system 1200 is a gateway (e.g., gateway 106 of one or more of FIGS. 1-2A). The computer system 1200 may have more or less components than those shown in FIG. 12 (e.g., gateway 106 may have fewer components than shown in computer system 1200). In one embodiment, the computer system may include instructions to enable execution of one or more of the processes and/or corresponding components shown and described in connection with one or more of FIGS. 1-11C.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. In various implementations of the present disclosure, the processing device 1202 is configured to perform the operations and processes described herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable storage medium 1228 (or machine-readable medium) on which is stored one or more sets of instructions of the distributed EMS 102 embodying any one or more of the methodologies or functions described herein. The instructions may also reside, completely or at least partially, within the main memory 1204 and/or within processing logic 1226 of the processing device 1202 during execution thereof by the computer system 1200, the main memory 1204 and the processing device 1202 also constituting computer-readable media.

The instructions may further be transmitted or received over a network 1220 via the network interface device 1208. While the computer-readable storage medium 1228 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "isolating," "determining," "causing," "providing," "receiving," "generating," "calculating," "transmitting," "storing," "updating," determining," "configuring," "associating," "training," "obtaining," "re-training," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying a plurality of images corresponding to sky conditions;
   isolating cloud pixels from sky pixels in each of the plurality of images;
   responsive to determining percentage of cloud pixels in one or more of the plurality of images meets a threshold value, determining predicted cloud movement relative to sun position by tracking similar feature points between two or more images of the plurality of images;
   triangulating, based on the plurality of images, to determine a height of one or more clouds; and
   causing a tint level of an electrochromic device to be controlled based on the predicted cloud movement relative to the sun position and based on the height of the one or more clouds.

2. The method of claim 1, wherein the plurality of images are a series of auto-exposure, fisheye, low dynamic range (LDR) images that were captured at a set frequency and undistorted by projecting pixels onto a rectangular plane.

3. The method of claim 1, wherein the isolating of the cloud pixels from the sky pixels further comprises:
   providing the plurality of images as input to a trained machine learning model; and receiving output from the trained machine learning model, wherein the predicted cloud
   movement relative to the sun position is based on the output.

4. The method of claim 1, further comprising determining a cloud direction angle from the predicted cloud movement relative to the sun position.

5. The method of claim 4, further comprising:
   generating, based on the cloud pixels and the sky pixels, a plurality of vector shapes, wherein a first vector shape of the plurality of vector shapes is located proximate the sun position, a second vector shape of the plurality of vector shapes is located proximate the first vector shape in a direction of about 180 degrees from the cloud direction angle, wherein the first vector shape is disposed between the sun position and the second vector shape, wherein each vector shape of the plurality of vector shapes represents a respective predicted time event that is to occur after capturing of the plurality of images, and wherein length and distance from the sun position of each vector shape correlates to a cloud speed; and
   calculating the percentage of cloud pixels in each vector shape corresponding to the respective predicted time event.

6. The method of claim 5, wherein each of the plurality of vector shapes is rectangular.

7. The method of claim 1, wherein the causing of the tint level of the electrochromic device to be controlled is based on change time of about 10 seconds to about 2 minutes to change the tint level of the electrochromic device.

8. The method of claim 1 further comprising:
   generating a cloud mask for each of the plurality of images based on the cloud pixels and the sky pixels; and
   determining cloud-edge to cloud-area ratio from the cloud mask, wherein the determining that the percentage of cloud pixels in one or more of the plurality of images meets the threshold value comprises determining the cloud-edge to cloud-area ratio meets the threshold value.

9. The method of claim 1, wherein the causing of the tint level to be controlled comprises causing the electrochromic device to be cleared responsive to determining the sun position is to be obstructed for a threshold amount of time.

10. The method of claim 1, further comprising identifying illuminance data received from an illuminance sensor of a sky sensor, wherein the plurality of images are captured by an imaging device of the sky sensor, and wherein the causing of the tint level to be controlled is further based on the illuminance data.

11. The method of claim 10, further comprising determining direct normal illuminance (DNE) data based on the illuminance data and the plurality of images, and wherein the causing of the tint level of the electrochromic device to be controlled is further based on the DNE data.

12. The method of claim 1, wherein a first subset of the plurality of images are captured by a first imaging device and a second subset of the plurality of images are captured by a second imaging device.

13. A system comprising: a memory; and
   a processing device, operatively coupled to the memory, wherein the processing device is configured to:
      identify a plurality of images corresponding to sky conditions;
      isolate cloud pixels from sky pixels in each of the plurality of images;
      responsive to determining percentage of cloud pixels in one or more of the plurality of images meets a threshold value, determine predicted cloud movement relative to sun position by tracking similar feature points between two or more images of the plurality of images;
      triangulate, based on the plurality of images, to determine a height of one or more clouds; and
      cause a tint level of an electrochromic device to be controlled based on the predicted cloud movement relative to the sun position and based on the height of the one or more clouds.

14. The system of claim 13, wherein to isolate the cloud pixels from the sky pixels, the processing device is further configured to:
   provide the plurality of images as input to a trained machine learning model; and receive output from the trained machine learning model, wherein the processing
   device determines the predicted cloud movement relative to the sun position based on the output.

15. The system of claim 13, wherein the processing device is further configured to determine a cloud direction angle from the similar feature points in the two or more images of the plurality of images.

16. The system of claim 15, wherein the processing device is further configured to: generate, based on the cloud pixels and the sky pixels, a plurality of vector shapes,
   wherein a first vector shape of the plurality of vector shapes is located proximate the sun position, a second vector shape of the plurality of vector shapes is located proximate the first vector shape in a direction of about 180 degrees from the cloud direction angle, wherein the first vector shape is disposed between the sun position and the second vector shape, wherein each vector shape of the plurality of vector shapes represents a respective predicted time event that is to occur after capturing of the plurality of images, and wherein length and distance from the sun position of each vector shape correlates to a cloud speed; and calculate the percentage of cloud pixels in each vector shape corresponding to the respective predicted time event.

17. The system of claim 13, wherein the processing device is further configured to: generate a cloud mask for each of the plurality of images based on the cloud pixels and the sky pixels; and determine cloud-edge to cloud-area ratio from the cloud mask, wherein the determining that the percentage of cloud pixels meets the threshold value comprises determining the cloud-edge to cloud-area ratio meets the threshold value.

18. A non-transitory machine-readable storage medium storing instructions which, when executed cause a processing device to perform operations comprising:

identifying a plurality of images corresponding to sky conditions; isolating cloud pixels from sky pixels in each of the plurality of images;

responsive to determining percentage of cloud pixels in one or more of the plurality of images meets a threshold value, determining predicted cloud movement relative to sun position by tracking similar feature points between two or more images of the plurality of images;

triangulating, based on the plurality of images, to determine a height of one or more clouds; and causing a tint level of an electrochromic device to be controlled based on the predicted cloud movement relative to the sun position and based on the height of the one or more clouds.

19. The non-transitory machine-readable storage medium of claim 18, wherein the isolating of the cloud pixels from the sky pixels further comprises:

providing the plurality of images as input to a trained machine learning model; and receiving output from the trained machine learning model, wherein the determining of the predicted cloud movement relative to the sun position is based on the output.

20. The non-transitory machine-readable storage medium of claim 18, wherein the operations further comprise:

generating a cloud mask for each of the plurality of images based on the cloud pixels and the sky pixels; and determining cloud-edge to cloud-area ratio from the cloud mask, wherein the determining that the percentage of cloud pixels meets the threshold value comprises determining the cloud-edge to cloud-area ratio meets the threshold value.

* * * * *